(12) United States Patent
Kishimoto et al.

(10) Patent No.: US 8,617,768 B2
(45) Date of Patent: Dec. 31, 2013

(54) CARBON CATALYST FOR DIRECT FUEL CELL CATHODE, AND DIRECT FUEL CELL CATHODE AND DIRECT FUEL CELL USING SAME

(75) Inventors: Takeaki Kishimoto, Chiba (JP); Rieko Kobayashi, Chiba (JP); Jun-ichi Ozaki, Kiryu (JP)

(73) Assignees: Nisshinbo Holdings Inc., Tokyo (JP); National University Corporation Gunma University, Maebashi-Shi (JP)

( * ) Notice: Subject to any disclaimer, the term of this patent is extended or adjusted under 35 U.S.C. 154(b) by 0 days.

(21) Appl. No.: 13/641,551

(22) PCT Filed: Apr. 19, 2011

(86) PCT No.: PCT/JP2011/059631
§ 371 (c)(1),
(2), (4) Date: Oct. 16, 2012

(87) PCT Pub. No.: WO2011/132676
PCT Pub. Date: Oct. 27, 2011

(65) Prior Publication Data
US 2013/0040224 A1 Feb. 14, 2013

(30) Foreign Application Priority Data
Apr. 20, 2010 (JP) ................................. 2010-097184

(51) Int. Cl.
*H01M 8/22* (2006.01)
(52) U.S. Cl.
USPC ........................................................ 429/506
(58) Field of Classification Search
None
See application file for complete search history.

(56) References Cited

U.S. PATENT DOCUMENTS

| 3,755,193 | A * | 8/1973 | Luft et al. ..................... 502/101 |
| 7,629,071 | B2 * | 12/2009 | Liu et al. ........................ 429/434 |
| 2004/0161641 | A1 | 8/2004 | Lee et al. |
| 2011/0136036 | A1 | 6/2011 | Miyata et al. |
| 2011/0143253 | A1 | 6/2011 | Miyata et al. |
| 2011/0319257 | A1 | 12/2011 | Wood et al. |

FOREIGN PATENT DOCUMENTS

| CA | 2 779 403 A1 | 5/2011 |
| JP | A-2004-253385 | 9/2004 |
| JP | A-2007-26746 | 2/2007 |
| JP | A-2008-21638 | 1/2008 |
| JP | A-2008-135380 | 6/2008 |
| JP | A-2008-282725 | 11/2008 |

(Continued)

OTHER PUBLICATIONS

Kim et al., Synthesis and characterization of PtNx/C as methanol-tolerant oxygen reduction electrocatalysts for a direct methanol fuel cell, Journal of Power Sources, 181 (2008) 74-78, Available online Mar. 21, 2008).*

(Continued)

*Primary Examiner* — Patrick Joseph Ryan
*Assistant Examiner* — Jose Colucci Rios
(74) *Attorney, Agent, or Firm* — Oliff & Berridge, PLC

(57) ABSTRACT

Provided is a carbon catalyst for a cathode of a direct fuel cell, which selectively promotes an oxygen reduction reaction even when crossover of a fuel compound occurs. The carbon catalyst for a cathode of a direct fuel cell exhibits an oxygen-reducing catalytic activity in an electrolytic solution containing a fuel compound for the direct fuel cell, and exhibits substantially no catalytic activity to oxidize the fuel compound in the electrolytic solution.

18 Claims, 16 Drawing Sheets

(56) References Cited

FOREIGN PATENT DOCUMENTS

| | | |
|---|---|---|
| JP | A-2009-291706 | 12/2009 |
| JP | A-2009-291714 | 12/2009 |
| WO | WO 2008/127828 A1 | 10/2008 |
| WO | WO 2011/055739 A1 | 5/2011 |

OTHER PUBLICATIONS

Popov et al., Development of high performance carbon composite catalyst for oxygen reduction reaction in PEM Proton Exchange Membrane fuel cells, Journal of Power Sources, 183 (2008) 34-42, Available online May 15, 2008.*

Osaki et al., Enhancement of oxygen reduction activity of nanoshell carbons by introducing nitrogen atoms from metal phthalocyanines, Electrochimica Acta 55 (2010) 1864-1871, Available online Oct. 21, 2009.*

International Search Report issued in International Patent Application No. PCT/JP2011/059631 mailed Jul. 12, 2011.

International Preliminary Report on Patentability issued in International Patent Application No. PCT/JP2011/059631 dated Nov. 6, 2012.

* cited by examiner

| METHANOL CONCENTRATION mol/L | REDUCTION CURRENT (mA/cm²) | | | |
|---|---|---|---|---|
| | EXAMPLE 1-1 | EXAMPLE 1-2 | EXAMPLE 1-3 | COMPARATIVE EXAMPLE 1 |
| 0 | −0.73 | −0.92 | −1.12 | − |
| 0.01 | −0.73 | −0.92 | −1.12 | −2.3 |
| 0.05 | −0.73 | −0.92 | −1.12 | −2.5 |
| 0.10 | −0.73 | −0.92 | −1.12 | −1.0 |
| 0.25 | −0.73 | −0.92 | −1.12 | 5.6 |
| 0.50 | −0.73 | −0.92 | −1.12 | 8.7 |

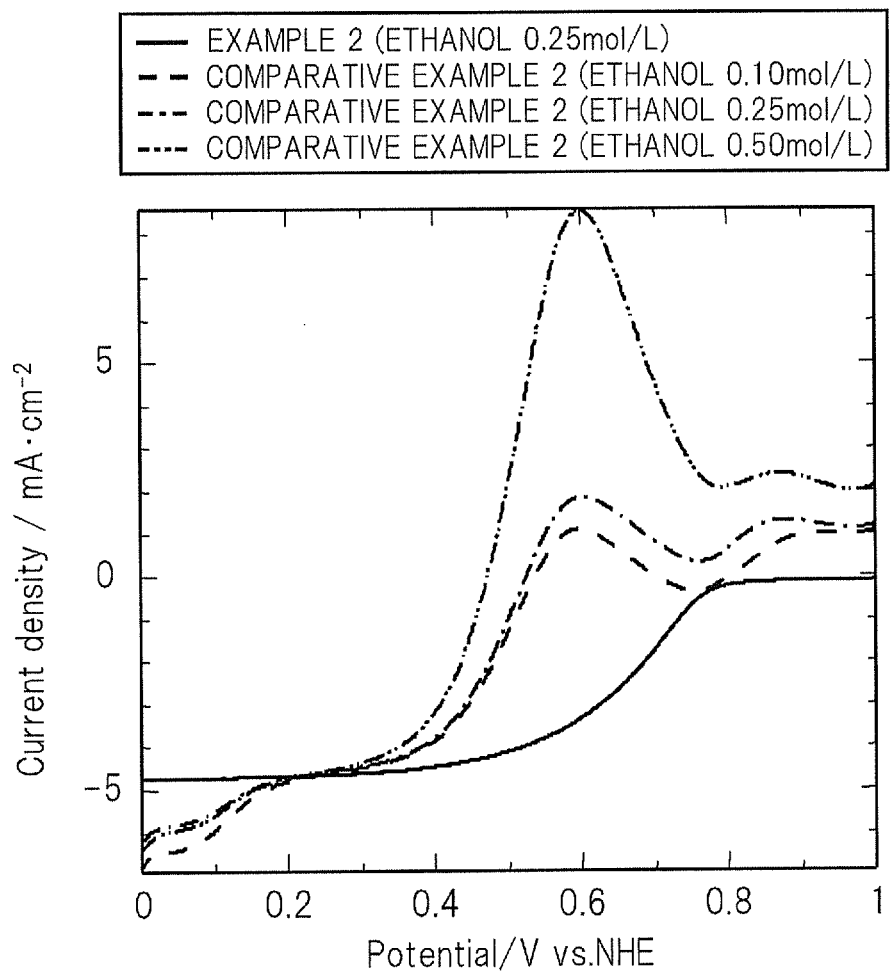

| ETHANOL CONCENTRATION mol/L | REDUCTION CURRENT (mA/cm²) | |
| --- | --- | --- |
| | EXAMPLE 2 | COMPARATIVE EXAMPLE 2 |
| 0.10 | -1.73 | -0.20 |
| 0.25 | -1.73 | 0.79 |
| 0.50 | -1.73 | 4.50 |
| 4.20 | -1.73 | 27.00 |

| FUEL COMPOUND | | REDUCTION CURRENT (mA/cm²) | |
|---|---|---|---|
| KIND | CONCENTRATION (mol/L) | EXAMPLE 3 | COMPARATIVE EXAMPLE 3 |
| METHANOL | 4.20 | −1.73 | 4.50 |
| ETHYLENE GLYCOL | 0.25 | −1.53 | −1.46 |
| ISOPROPYLALCOHOL | 0.25 | −2.05 | 5.36 | ns
CARBON CATALYST FOR DIRECT FUEL CELL CATHODE, AND DIRECT FUEL CELL CATHODE AND DIRECT FUEL CELL USING SAME

TECHNICAL FIELD

The present invention relates to a carbon catalyst for a cathode of a direct fuel cell, and a cathode for a direct fuel cell and a direct fuel cell which use the carbon catalyst, and more particularly, to a carbon catalyst which selectively promotes an oxygen reduction reaction even when crossover of a fuel compound occurs.

BACKGROUND ART

A direct fuel cell (DFC) is known as one of various types of fuel cells. For example, a direct methanol fuel cell (DMFC) using methanol as a fuel compound has a high energy density and is expected as a next-generation small power source. A chemical reaction in the DMFC is as follows: anode reaction: $CH_3OH+H_2O \rightarrow 6H+6e^-+CO_2$; cathode reaction: $1.5O_2+6H+6e^- \rightarrow 3H_2O$; and overall reaction: $CH_3OH+1.5O_2 \rightarrow 2H_2O+CO_2$.

However, a phenomenon called methanol crossover (MCO), in which methanol supplied to an anode cannot react completely in the anode reaction, and unreacted methanol passes through a proton-conducting electrolyte membrane to move to a cathode, is becoming a problem.

In general, a platinum catalyst is used as a cathode catalyst for the DMFC. The platinum catalyst promotes not only an oxygen reduction reaction but also a methanol oxidation reaction. Therefore, methanol that has undergone crossover causes a methanol oxidation reaction in a cathode as well, which remarkably degrades power generation performance of the DMFC.

In view of the foregoing, conventionally, platinum and other noble metals such as palladium (Pd) and ruthenium (Ru) which promote only the oxygen reduction reaction have been used in combination as a cathode catalyst (see, for example, Patent Literatures 1 and 2).

CITATION LIST

Patent Literature

[Patent Literature 1] JP 2008-135380 A
[Patent Literature 2] JP 2004-253385 A

SUMMARY OF INVENTION

Technical Problem

However, in the prior art using a noble metal catalyst, for example, there is a problem in that the generation of an oxide coating film and metal elution on the surface of an electrode due to an electrolytic reaction result in a gradual decrease in current value to be obtained. There are also problems such as an increase in cost due to the use of a noble metal and a limitation related to the amount of deposit of a noble metal.

There is also an example in which an alloy catalyst is used without using any noble metal. However, it is difficult to avoid the problem of metal elution sufficiently and obtain a sufficient oxygen-reducing activity.

The present invention has been made so as to solve the problems, and it is an object of the present invention to provide a carbon catalyst for a cathode of a direct fuel cell, which selectively promotes an oxygen reduction reaction even when crossover of a fuel compound such as methanol occurs, and a cathode for a direct fuel cell and a direct fuel cell which use the carbon catalyst.

Solution to Problem

A carbon catalyst for a cathode of a direct fuel cell according to an embodiment of the present invention for achieving the object is a carbon catalyst for a cathode of a direct fuel cell, which is used for a cathode of a direct fuel cell, the carbon catalyst exhibiting an oxygen-reducing catalytic activity in an electrolytic solution containing a fuel compound for the direct fuel cell and exhibiting substantially no catalytic activity to oxidize the fuel compound in the electrolytic solution. According to the present invention, a carbon catalyst for a cathode of a direct fuel cell, which selectively promotes an oxygen reduction reaction even when crossover of a fuel compound occurs, is provided.

Further, a reduction current may be −0.6 mA/cm$^2$ or less at a potential of 0.7 V (vs. NHE) in sweeping at a sweep rate of 1 mV/sec at 25° C. using an oxygen-saturated electrolytic solution containing the fuel compound at a concentration of 0.25 mol/L, in linear sweep voltammetry using the carbon catalyst for a working electrode of a three-electrode system.

Further, the carbon catalyst may exhibit no catalytic activity to oxidize the fuel compound influencing the oxygen-reducing catalytic activity of the carbon catalyst at a potential ranging from 0.6 V (vs. NHE) to 1.0 V (vs. NHE) in the case of using a nitrogen-saturated electrolytic solution containing the fuel compound, in cyclic voltammetry performed at 25° C. using the carbon catalyst for a working electrode of a three-electrode system.

Further, a reduction current at a potential of 0.7 V (vs. NHE) in sweeping at a sweep rate of 1 mV/sec at 25° C. using an oxygen-saturated electrolytic solution containing the fuel compound, in linear sweep voltammetry using the carbon catalyst for a working electrode of a three-electrode system, may be substantially independent of a concentration of the fuel compound contained in the electrolytic solution.

Further, the fuel compound may include an alcohol.

A carbon catalyst for a cathode of a direct fuel cell according to an embodiment of the present invention for achieving the object is a carbon catalyst for a cathode of a direct fuel cell, which is used for a cathode of a direct fuel cell and has an oxygen-reducing catalytic activity, in which a reduction current may be −0.6 mA/cm$^2$ or less at a potential of 0.7 V (vs. NHE) in sweeping at a sweep rate of 1 mV/sec at 25° C. using an oxygen-saturated electrolytic solution containing a fuel compound for the direct fuel cell at a concentration of 0.25 mol/L, in linear sweep voltammetry using the carbon catalyst for a working electrode of a three-electrode system. According to the present invention, a carbon catalyst for a cathode of a direct fuel cell, which selectively promotes an oxygen reduction reaction even when crossover of a fuel compound occurs, is provided.

A carbon catalyst for a cathode of a direct fuel cell according to an embodiment of the present invention for achieving the object is a carbon catalyst for a cathode of a direct fuel cell, which is used for a cathode of a direct fuel cell and has an oxygen-reducing catalytic activity, the carbon catalyst exhibiting no catalytic activity to oxidize a fuel compound for the direct fuel cell influencing the oxygen-reducing catalytic activity of the carbon catalyst at a potential ranging from 0.6 V (vs. NHE) to 1.0 V (vs. NHE) in a case of using a nitrogen-saturated electrolytic solution containing the fuel compound, in cyclic voltammetry performed at 25° C. using the carbon catalyst for a working electrode of a three-electrode system. According to the present invention, a carbon catalyst for a cathode of a direct fuel cell, which selectively promotes an oxygen reduction reaction even when crossover of a fuel compound occurs, is provided.

Further, the carbon catalyst may be a carbon catalyst obtained by carbonizing raw materials including a nitrogen-containing organic substance and a metal. In this case, the raw materials further include a conductive carbon material. Further, the carbon catalyst may be a carbon catalyst obtained by subjecting a carbonized material obtained by carbonizing the raw materials to metal removal treatment and further subjecting the carbonized material to heat treatment. Further, the carbon catalyst may be a carbon catalyst obtained by subjecting a carbonized material obtained by carbonizing the raw materials to metal impregnation treatment and further subjecting the carbonized material to heat treatment.

A cathode for a direct fuel cell according to an embodiment of the present invention for achieving the object includes the carbon catalyst. According to the present invention, a cathode for a direct fuel cell, which selectively promotes an oxygen reduction reaction even when crossover of a fuel compound occurs, is provided.

A direct fuel cell according to an embodiment of the present invention for achieving the object includes a cathode including anyone of the carbon catalysts. According to the present invention, a direct fuel cell, in which an oxygen reduction reaction selectively proceeds in a cathode even when crossover of a fuel compound occurs, is provided.

Advantageous Effects of Invention

According to the present invention, there is provided a carbon catalyst for a cathode of a direct fuel cell, which selectively promotes an oxygen reduction reaction even when crossover of a fuel compound occurs, and a cathode for a direct fuel cell and a direct fuel cell which use the carbon catalyst.

BRIEF DESCRIPTION OF DRAWINGS

[FIG. 5A] An explanatory diagram showing an example of a voltammogram obtained in linear sweep voltammetry using a carbon catalyst according to an embodiment of the present invention and a platinum catalyst, and using ethanol as a fuel compound.

DESCRIPTION OF EMBODIMENTS

Figure 1A:
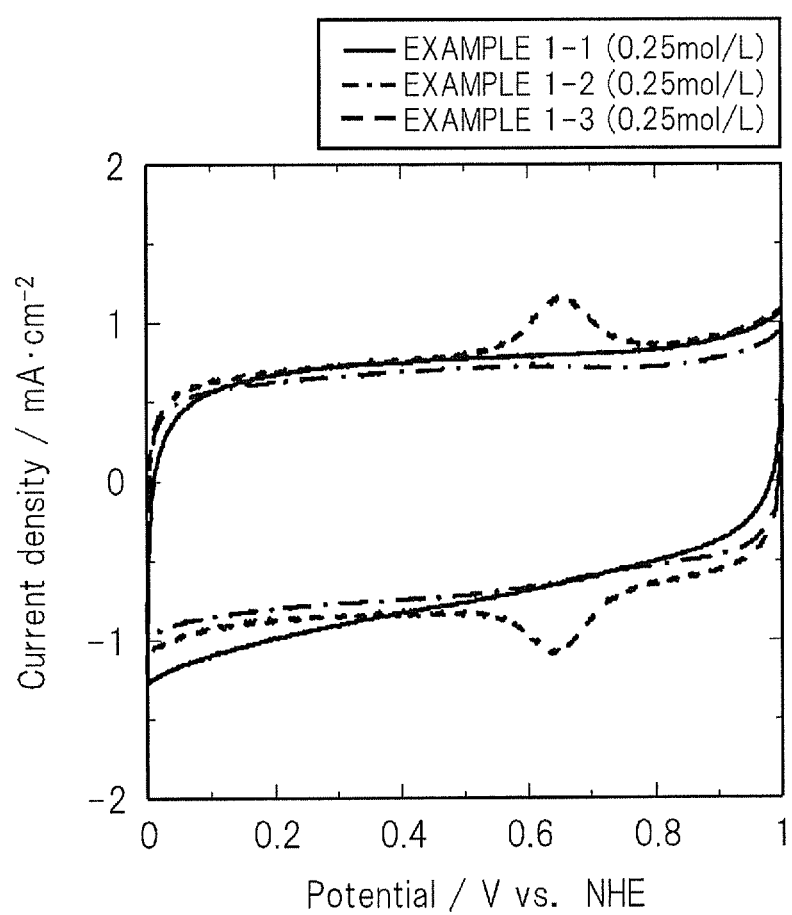
[FIG. 1A] An explanatory diagram showing an example of a voltammogram obtained in cyclic voltammetry using a carbon catalyst according to an embodiment of the present invention and using methanol as a fuel compound.

Hereinafter, an embodiment of the present invention is described. It should be noted that the present invention is not limited to an example shown in this embodiment.

A carbon catalyst for a cathode of a direct fuel cell according to this embodiment (hereinafter, referred to as "catalyst of the present invention") is a carbon catalyst having an oxygen-reducing catalytic activity. That is, the catalyst of the present invention is a carbon material having a catalytic activity in itself that promotes a reduction reaction of oxygen in a cathode of a direct fuel cell. That is, the catalyst of the present invention is, for example, a carbon catalyst exhibiting an oxygen-reducing catalytic activity without carrying a metal catalyst (for example, a noble metal catalyst such as platinum).

It should be noted that a fuel compound for a direct fuel cell is not particularly limited as long as it is a compound used as a fuel in the direct fuel cell, and any organic compound and/or inorganic compound may be used. The fuel compound is, for example, a compound that is oxidized on an anode side of a fuel cell and generates protons and electrons.

Further, the fuel compound may be, for example, a compound having a hydroxyl group, preferably a water-soluble compound having a hydroxyl group. That is, the fuel compound may be, for example, an alcohol, preferably an alcohol having 1 to 6 carbon atoms.

In addition, the fuel compound may be, for example, a primary alcohol and/or a secondary alcohol, preferably a primary alcohol and/or a secondary alcohol each having 1 to 6 carbon atoms. Further, the fuel compound may be, for example, a monohydric alcohol and/or a polyhydric alcohol, preferably a monohydric alcohol and/or a polyhydric alcohol each having 1 to 6 carbon atoms. More specifically, the fuel compound may be, for example, a primary or secondary, monohydric or polyhydric alcohol, and may be a primary or secondary, monohydric or polyhydric alcohol having 1 to 6 carbon atoms.

Specifically, the fuel compound may be, for example, one kind or two or more kinds selected from the group consisting of methanol, ethanol, n-propyl alcohol, isopropyl alcohol, ethylene glycol, glycerol, glucose, and sucrose.

In addition, the catalyst of the present invention is a carbon catalyst used in a cathode of a direct fuel cell, the carbon catalyst exhibiting an oxygen-reducing catalytic activity in an electrolytic solution containing a fuel compound for the direct fuel cell and exhibiting substantially no catalytic activity to oxidize the fuel compound in the electrolytic solution.

That is, the catalyst of the present invention is, for example, a carbon catalyst having an oxygen-reducing catalytic activity, in which a reduction current is $-0.6$ mA/cm$^2$ or less at a potential of 0.7 V (vs. NHE) in sweeping at a sweep rate of 1 mV/sec at 25° C. using an oxygen-saturated electrolytic solution containing a fuel compound at a concentration of 0.25 mol/L, in linear sweep voltammetry using the carbon catalyst for a working electrode of a three-electrode system. In this case, the reduction current may also be $-0.7$ mA/cm$^2$ or less.

The linear sweep voltammetry may be performed by, for example, a rotating ring-disc electrode method using a working electrode carrying the catalyst of the present invention and a reference electrode and a counter electrode. As the electrolytic solution, for example, a 0.5 M sulfuric acid aqueous solution may be used.

It should be noted that in the linear sweep voltammetry, even in the case of using an oxygen-saturated electrolytic solution containing no fuel compound, the catalyst of the present invention exhibits an oxygen-reducing catalytic activity that is equal to or higher than that in the case of using an electrolytic solution containing a fuel compound.

Further, the catalyst of the present invention may be a carbon catalyst exhibiting a higher oxygen-reducing catalytic activity in an electrolytic solution containing a fuel compound. That is, the reduction current in the linear sweep voltammetry may be, for example, $-0.8$ mA/cm$^2$ or less, and may also be $-0.9$ mA/cm$^2$ or less. In addition, the reduction current may be, for example, $-1.0$ mA/cm$^2$ or less, and may also be $-1.1$ mA/cm$^2$ or less.

It should be noted that although there is no particular limit to a lower limit value of the reduction current, for example, the reduction current may be $-4.0$ mA/cm$^2$ or more.

Further, the catalyst of the present invention is, for example, a carbon catalyst having an oxygen-reducing catalytic activity, the carbon catalyst exhibiting no catalytic activity to oxidize a fuel compound influencing the oxygen-reducing catalytic activity of the carbon catalyst at a potential ranging from 0.6 V (vs. NHE) to 1.0 V (vs. NHE) in a case of using a nitrogen-saturated electrolytic solution containing the fuel compound, in cyclic voltammetry performed at 25° C. using the carbon catalyst for a working electrode of a three-electrode system.

That is, the catalyst of the present invention exhibits no catalytic activity to promote an oxidation reaction of a fuel compound at a potential ranging from 0.6 V (vs. NHE) to 1.0 V (vs. NHE) in any of the case of using a nitrogen-saturated electrolytic solution containing no fuel compound and the case of using a nitrogen-saturated electrolytic solution containing the fuel compound in the cyclic voltammetry.

Specifically, for example, even in the case of using a nitrogen-saturated electrolytic solution containing a fuel compound in the cyclic voltammetry, a current-potential curve obtained by sweeping a potential in a positive direction and a current-potential curve obtained by sweeping a potential in a negative direction become substantially symmetrical.

It should be noted that the cyclic voltammetry may be performed by, for example, a rotating ring-disc electrode method using a working electrode carrying the catalyst of the present invention and a reference electrode and a counter electrode. Further, in the cyclic voltammetry, for example, a potential may also be swept at a sweep rate of 50 mV/sec.

There is no particular limit to the concentration of a fuel compound contained in an electrolytic solution to be used in the cyclic voltammetry, and for example, the concentration may be within a range of 0.01 mol/L to 5.00 mol/L. The concentration of the fuel compound may also be within, for example, a range of 0.01 mol/L to 0.50 mol/L. More specifically, the concentration may be, for example, 0.01 mol/L, 0.05 mol/L, 0.10 mol/L, 0.25 mol/L, or 0.50 mol/L. As the electrolytic solution, for example, a 0.5 M sulfuric acid aqueous solution may be used.

As described above, the catalyst of the present invention is a carbon catalyst exhibiting substantially no catalytic activity to oxidize a fuel compound in an electrolytic solution containing the fuel compound. For example, the catalyst of the present invention may be a carbon catalyst in which a difference in reduction current (mA/cm$^2$) at a potential of 0.7 V (vs. NHE) between the case of using an oxygen-saturated electrolytic solution containing no fuel compound and the case of using an oxygen-saturated electrolytic solution containing the fuel compound is 0.15 mA/cm$^2$ or less in the linear sweep voltammetry. That is, when the reduction current in the case of using an oxygen-saturated electrolytic solution containing no fuel compound is defined as $A_0$ (mA/cm$^2$), the reduction current in the case of using an oxygen-saturated electrolytic solution containing the fuel compound is $A_0 \pm 0.15$ (mA/cm$^2$).

There is no particular limit to the concentration of a fuel compound contained in an electrolytic solution to be used in the linear sweep voltammetry, and for example, the concentration may be within a range of 0.01 mol/L to 5.00 mol/L, may be within a range of 0.05 mol/L to 5.00 mol/L, and may be within a range of 0.10 mol/L to 5.00 mol/L. The concentration of the fuel compound may also be within, for example, a range of 0.01 mol/L to 0.50 mol/L. More specifically, the concentration may be, for example, 0.01 mol/L, 0.05 mol/L, 0.10 mol/L, 0.25 mol/L, or 0.50 mol/L. As the electrolytic solution, for example, a 0.5 M sulfuric acid aqueous solution may be used.

Further, the catalyst of the present invention may be, for example, a carbon catalyst, in which a reduction current at apotential of 0.7 V (vs. NHE) in sweeping at a sweep rate of 1 mV/sec at 25° C. in the linear sweep voltammetry is substantially independent of the concentration of a fuel compound contained in an electrolytic solution.

That is, in this case, for example, a difference in reduction current at a potential of 0.7 V (vs. NHE) between the case where the concentration of a fuel compound contained in an electrolytic solution is 0.01 mol/L and the case where the concentration is 0.05 mol/L, 0.10 mol/L, 0.25 mol/L, or 0.50 mol/L is 0.15 mA/cm$^2$ or less.

Further, for example, in the case where the concentration of a fuel compound falls within a range of 0.05 mol/L to 0.50 mol/L, the catalyst of the present invention may be a carbon catalyst in which a difference in reduction current (mA/cm$^2$) at a potential of 0.7 V (vs. NHE) between the case of using an oxygen-saturated electrolytic solution containing 0.05 mol/L of the fuel compound and the case of using an oxygen-saturated electrolytic solution containing 0.10 mol/L to 0.50 mol/L of the fuel compound is 0.01 mA/cm$^2$ or less in the linear sweep voltammetry. Further, similarly, a difference in reduction current between the case where the concentration of a fuel compound is 0.10 mol/L and the case where the concentration is 0.25 mol/L to 0.50 mol/L may be 0.01 mA/cm$^2$ or less.

The catalyst of the present invention may be a carbon catalyst obtained by carbonizing raw materials containing a nitrogen-containing organic substance and a metal. There is no particular limit to the nitrogen-containing organic substance (hereinafter, simply referred to as "organic substance") contained in the raw materials as long as the organic substance contains 0.1% by weight or more of nitrogen with respect to the organic substance and can be carbonized (can be used as a carbon source), and any one kind of organic substance may be used alone, or two or more kinds thereof may be used in combination. The organic substance is contained as a carbon material precursor of an active catalyst in the raw materials.

As the organic substance, for example, one or both of a high-molecular organic compound (for example, a resin such as a thermoplastic resin and a thermosetting resin) and a low-molecular organic compound each containing a nitrogen atom in the molecule may be used. Further, for example, a biomass such as plant waste may also be used.

As the organic substance, for example, a ligand that coordinates to a metal may be preferably used. That is, in this case, an organic compound containing one or a plurality of coordinating atoms in the molecule is used. More specifically, for example, as a coordinating atom, there may be used an organic compound containing one kind or two or more kinds selected from the group constituting of a nitrogen atom, a phosphorus atom, an oxygen atom, and a sulfur atom in the molecule. Further, as a coordinating group, an organic compound containing one kind or two or more kinds selected from the group consisting of an amino group, a phosphino group, a carboxyl group, and a thiol group in the molecule may also be used.

Specifically, as the organic compound, there may be used, for example, one kind or two or more kinds selected from the group consisting of pyrrole, polypyrrole, polyvinylpyrrole, 3-methylpolypyrrole, furan, thiophene, oxazole, thiazole, pyrazole, vinylpyridine, polyvinylpyridine, pyridazine, pyrimidine, piperazine, pyran, morpholine, imidazole, 1-methylimidazole, 2-methylimidazole, quinoxaline, aniline, polyaniline, succinic acid dihydrazide, adipic acid dihydrazide, polysulfone, polyaminobismaleimide, polyimide, polyvinyl alcohol, polyvinylbutyral, benzimidazole, polybenzimidazole, polyamide, polyester, polylactic acid, acrylonitrile, polyacrylonitrile, polyether, polyether ether ketone, cellulose, lignin, chitin, chitosan, silk, wool, polyamino acid, a nucleic acid, DNA, RNA, hydrazine, hydrazide, urea, salen, polycarbazole, polybismaleimide, triazine, ionomer, polyacrylic acid, polyacrylic acid ester, polymethacrylic acid ester, polymethacrylic acid, polyurethane, polyamide-amine, polycarbodiimide, a polyacrylonitrile-polymethacrylic acid copolymer, a phenolic resin, melamine, a melamine resin, an epoxy resin, a furan resin, and a polyamide-imide resin.

As the biomass such as waste, there may be used, for example, one kind or two or more kinds selected from the group consisting of food industrial waste such as sake cake, malted rice, coffee grounds, used tea leaves, brewer's spent grains, and rice bran, wooden waste such as a forest land remainder material and building waste, and domestic waste such as sewage sludge.

The organic substance may further contain a component for enhancing the activity of the catalyst of the present invention. That is, for example, the organic substance may further contain, as the component for enhancing the activity of the catalyst of the present invention, one kind or two or more kinds selected from the group consisting of boron, phosphorus, oxygen, and sulfur. Further, the organic substance may contain a metal salt and a metal complex.

There is no particular limit to the metal contained in the raw materials as long as the metal does not inhibit the catalytic activity of the catalyst of the present invention, and the metal may be appropriately selected depending on the purpose. Any one kind of metal may be used alone, or two or more kinds thereof may be used in combination.

That is, as the metal, there may be used, for example, one kind or two or more kinds of metals selected from the group consisting of periodic table Group III, Group IV, Group V, Group VI, Group VII, Group VIII, Group IX, Group X, Group XI, Group XII, Group XIII, and Group XVI elements may be used, and a transition metal may be preferably used.

Specifically, there may be used, for example, one kind or two or more kinds of metals selected from the group consisting of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), ruthenium (Ru), rhodium (Rh), palladium (Pd), elements of the lanthanoid series (cerium (Ce) and the like), and elements of the actinoid series. Of those, iron, cobalt, or nickel may be particularly preferably used. Although there is no particular limit to the number of kinds of metals to be used for production of the catalyst of the present invention, for example, the number of kinds may be set to 30 or less, and one to ten kinds of metals may be preferably used.

As the metal, a simple substance of the metal or a compound of the metal may be used. As the metal compound, there may be used, for example, a metal salt, a metal oxide, a metal hydroxide, a metal nitride, a metal sulfide, a metal carbide, and a metal complex. Of those, a metal salt, a metal oxide, a metal sulfide, and a metal complex may be preferably used. It should be noted that in the case of using a ligand as the above-mentioned organic compound, a metal complex is formed in the raw materials. Further, in the case where the above-mentioned organic substance contains a metal salt and a metal complex, the raw materials may further contain a metal in addition to the organic substance.

The raw materials may further contain a conductive carbon material. There is no particular limit to the conductive carbon material as long as it imparts conductivity to the catalyst of the present invention and enhances the conductivity of the catalyst of the present invention, and any one kind of conductive carbon material may be used alone, or two or more kinds thereof may be used in combination. As the conductive carbon material, there may be used, for example, a carbon material having conductivity and having no catalytic activity in itself.

Specifically, there may be used, for example, one kind or two or more kinds selected from the group consisting of carbon black, a carbon nanotube, a carbon nanohorn, a carbon fiber, a carbon fibril, and graphite powder, and a material having high conductivity may be preferably used.

In the case where the raw materials contain a conductive carbon material, for example, a carbonized material generated by carbonizing an organic substance is sufficiently dispersed in the conductive carbon material so that the conductive carbon material carries the carbonized material, whereby an active point of the catalyst of the present invention is increased and a high catalytic activity is realized.

Further, as the conductive carbon material, there may be used, for example, a conductive carbon material that carries a metal in advance. That is, in this case, there may be used, for example, a conductive carbon material carrying a transition metal that enhances the activity and oxidation resistance performance of the catalyst of the present invention. As the transition metal, there may be preferably used, for example, one kind or two or more kinds selected from the group consisting of titanium, chromium, manganese, iron, cobalt, nickel, copper, zinc, gallium, zirconium, niobium, molybdenum, lanthanum, cerium, neodymium, tantalum, and tungsten.

In the production of the catalyst of the present invention, first, prior to carbonization, raw materials containing the above-mentioned organic substance and metal and further containing a conductive carbon material, if required, are mixed. There is no particular limit to the method of mixing the raw materials, and for example, a mortar or a stirring device may be used. Further, powder mixing involving mixing the organic substance and metal (and the conductive carbon material, if required) in a powdery state or solvent mixing involving adding a solvent to mix the organic substance and metal may be used, and two or more kinds of mixing methods may also be used.

Then, the raw materials prepared as described above are carbonized. That is, the raw materials are heated and kept at a predetermined temperature (carbonizing temperature) at which the raw materials are carbonized. There is no particular limit to the carbonizing temperature as long as the carbonizing temperature is a temperature at which the raw materials are carbonized, and the carbonizing temperature may be, for example, 300° C. or more. More specifically, the carbonizing temperature may be, for example, 300° C. or more and 1,500° C. or less, preferably 400° C. or more and 1,200° C. or less.

The rate of temperature increase in heating the raw materials to the carbonizing temperature is not particularly limited and may be, for example, 0.5° C./min or more and 300° C./min or less. The time (carbonizing time) for which the raw materials are kept at the carbonizing temperature is not particularly limited as long as the time allows the raw materials to be carbonized, and may be, for example, 5 minutes or more. More specifically, the carbonizing time may be, for example, 5 minutes or more and 180 minutes or less, preferably 20 minutes or more and 120 minutes or less. Further, it is preferred that the carbonization be performed in the presence of an inert gas such as nitrogen (for example, under the flow of an inert gas) or in a vacuum. Consequently, a carbonized material generated by carbonizing the raw materials is obtained. Then, for example, the carbonized material may be used as the catalyst of the present invention.

Further, the catalyst of the present invention may be obtained by, for example, doping a carbonized material obtained by carbonizing raw materials with a nitrogen atom. As the method of doping the carbonized material with a nitrogen atom, there may be employed, for example, a gas-phase doping method, a liquid-phase doping method, or a gas-phase-liquid-phase doping method. Specifically, for example, the surface of the carbonized material may be doped with nitrogen atoms by mixing a nitrogen source such as ammonia, melamine, or acetonitrile with the carbonized material, and subjecting the resultant mixture to heat treatment involving keeping the mixture in the atmosphere of an inert gas such as nitrogen, argon, or helium at a temperature of 550° C. or more and 1,200° C. or less for a time of 5 minutes or more and 180 minutes or less. Further, the obtained carbonized material may also be subjected to ammooxidation, carbon dioxide activation, phosphoric acid activation, alkali activation, or water vapor activation.

Further, the catalyst of the present invention may be obtained by, for example, pulverizing a carbonized material obtained by carbonizing raw materials. The method of pulverizing the carbonized material is not particularly limited, and for example, a pulverizing device such as a ball mill or a bead mill may be used. It is preferred that the average particle diameter of the pulverized carbonized material be set to, for example, 150 μm or less.

Further, the catalyst of the present invention may be obtained by, for example, subjecting a carbonized material obtained by carbonizing raw materials to metal removal treatment. That is, for example, in the case where a metal is not required after carbonization, a carbonized material is subjected to metal removal treatment, if required. The metal removal treatment is not particularly limited as long as the treatment allows a metal contained in a carbonized material to be removed or allows the amount of the metal to be reduced, and for example, washing treatment with an acid or electrolytic treatment may be performed.

An acid to be used for acid washing is not particularly limited as long as the effect of metal removal treatment is obtained, and any one kind of acid or two or more kinds thereof may be used. That is, there may be used, for example, one kind or two or more kinds selected from the group consisting of hydrochloric acid (for example, concentrated hydrochloric acid), nitric acid (for example, concentrated nitric acid), and sulfuric acid (for example, concentrated sulfuric acid). In the case of using two or more kinds of acids, there may be used, for example, a mixed acid (for example, aqua regalis) prepared by mixing concentrated hydrochloric acid and concentrated nitric acid at a predetermined volume ratio or a mixed acid prepared by mixing concentrated nitric acid and concentrated sulfuric acid at a predetermined volume ratio.

The method of acid washing is not particularly limited as long as the effect of metal removal treatment is obtained, and for example, a method of soaking and keeping a carbonized material in a solution containing an acid may be employed. In this case, the carbonized material may also be kept in a boiled acid solution.

Further, the catalyst of the present invention may be, for example, a carbon catalyst obtained by subjecting a carbonized material obtained by carbonizing raw materials to metal removal treatment and further subjecting the carbonized material to heat treatment. That is, in this case, in the production of the catalyst of the present invention, the above-mentioned carbonized material subjected to metal removal treatment (for example, acid washing) is subjected to heat treatment. The heat treatment may be performed, for example, in the same way as in the above-mentioned carbonization. Specifically, the carbonized material after metal removal treatment is heated at a temperature of 300° C. or more and 1,500° C. or less. The treatments allow inactive metal components and the like remaining in a slight amount in the carbonized material to be removed, and a carbon catalyst on which an active point is exposed is obtained.

Further, the catalyst of the present invention may be, for example, a carbon catalyst obtained by subjecting a carbonized material obtained by carbonizing raw materials to metal impregnation treatment and further subjecting the carbonized material to heat treatment. In this case, the catalyst of the present invention may be, for example, a carbon catalyst obtained by subjecting a carbonized material obtained by carbonizing raw materials to metal impregnation treatment without subjecting the carbonized material to metal removal treatment, and further subjecting the carbonized material to heat treatment. Further, the catalyst of the present invention may be, for example, a carbon catalyst obtained by subjecting a carbonized material obtained by carbonizing raw materials to metal removal treatment, subjecting the carbonized material to metal impregnation treatment, and further subjecting the carbonized material to heat treatment.

That is, in the above-mentioned cases, in the production of the catalyst of the present invention, first, a carbonized material is impregnated with a metal. The metal with which the carbonized material is impregnated is not particularly limited as long as the metal does not inhibit the activity of the catalyst of the present invention, and any one kind of metal may be used alone, or two or more kinds thereof may be used in combination. Specifically, there may be used one kind or two or more kinds selected from the group consisting of titanium, iron, cobalt, nickel, zirconium, niobium, molybdenum, lanthanum, and cerium. Further, the metal with which the carbonized material is impregnated in the metal impregnation treatment may be a metal of a different kind from the metal contained in raw materials to be carbonized. Further, the metal may be used as a simple substance of the metal or a compound of the metal. As the metal compound, there may be used, for example, a metal salt, a metal oxide, a metal hydroxide, a metal nitride, a metal sulfide, a metal carbide, and a metal complex. Of those, a metal salt, a metal oxide, a metal sulfide, and a metal complex may be preferably used.

The method of impregnating a carbonized material with a metal is not particularly limited as long as at least the surface of the carbonized material is impregnated with the metal, and for example, a method of bringing the carbonized material into contact with a solution containing the metal may be employed. That is, for example, the carbonized material is impregnated with a metal by soaking and keeping the carbonized material in a metal-containing solution. In this case, the carbonized material may also be kept in a boiled metal-containing solution. Further, as the metal-containing solution, an acid solution may be used. In this case, the pH of the metal-containing solution may be, for example, 1 or more and 6 or less.

The heat treatment following the metal impregnation treatment may be performed, for example, in the same way as in the above-mentioned carbonization. Specifically, the carbonized material after the metal impregnation treatment is heated at a temperature of 300° C. or more and 1,500° C. or less.

Further, the catalyst of the present invention may be, for example, a carbon catalyst obtained by subjecting a carbonized material obtained by carbonizing raw materials to metal impregnation treatment, subjecting the carbonized material to heat treatment, and further subjecting the carbonized material to metal removal treatment. In this case, the catalyst of the present invention may also be, for example, a carbon catalyst obtained by subjecting a carbonized material obtained by carbonizing raw materials to metal impregnation treatment without subjecting the carbonized material to metal removal treatment, subjecting the carbonized material to heat treatment, and further subjecting the carbonized material to metal removal treatment. Further, the catalyst of the present invention may be, for example, a carbon catalyst obtained by subjecting a carbonized material obtained by carbonizing raw materials to metal removal treatment, subjecting the carbonized material to metal impregnation treatment, subjecting the carbonized material to heat treatment, and further subjecting the carbonized material to metal removal treatment. In the above-mentioned cases, the catalyst of the present invention may be, for example, a carbon catalyst obtained by subjecting the carbonized material to metal impregnation treatment followed by metal removal treatment, and subsequently subjecting the carbonized material to heat treatment again.

Further, the catalyst of the present invention may be obtained by, for example, subjecting a carbonized material obtained by carbonizing raw materials to surface treatment. As the surface treatment, for example, acid treatment may be employed. The acid treatment may be performed in the same way as in the above-mentioned acid washing for removing a metal. Further, as the surface treatment, the above-mentioned metal impregnation treatment may also be employed.

A cathode for a direct fuel cell according to this embodiment is a cathode (oxygen electrode) containing the above-mentioned carbon catalyst (catalyst of the present invention). The cathode may be, for example, one free of a metal catalyst (for example, a noble metal catalyst such as platinum). Further, the catalyst of the present invention and a metal catalyst (for example, a noble metal catalyst such as platinum) may be used in combination to the extent that the oxygen reduction reaction in the cathode is not remarkably impaired.

A direct fuel cell according to this embodiment includes a cathode including the above-mentioned carbon catalyst (catalyst of the present invention). That is, the direct fuel cell includes a membrane/electrode assembly (MEA) including a cathode carrying the above-mentioned carbon catalyst (catalyst of the present invention). Further, for example, in the case of using an alcohol as a fuel compound for the direct fuel cell, the direct fuel cell serves as a direct alcohol fuel cell including a cathode including the catalyst of the present invention. More specifically, for example, in the case of using methanol as a fuel compound, the direct fuel cell serves as a direct methanol fuel cell.

According to the present invention, there is provided a carbon catalyst for a cathode of a direct fuel cell, which selectively promotes an oxygen reduction reaction even when crossover of a fuel compound occurs, and a cathode for a direct fuel cell and a direct fuel cell which use the carbon catalyst.

That is, according to the present invention, for example, even when crossover of a fuel compound occurs in a cathode of a direct fuel cell, only an oxygen reduction reaction is selectively promoted with the catalyst of the present invention produced at relatively low cost without using an expensive noble metal-based catalyst such as platinum whose amount of deposit is limited.

Further, the oxygen-reducing catalytic activity of the catalyst of the present invention is not restricted by the concentration of a fuel compound, as described above, and hence, there is realized a direct fuel cell that achieves a stable output even when crossover of the fuel cell compound occurs.

Further, the catalyst of the present invention sufficiently keeps the oxygen-reducing catalytic activity even when the concentration of a fuel compound is relatively high, and hence, there is realized a direct fuel cell in which a fuel containing a fuel compound at a relatively high concentration (for example, a fuel containing an alcohol such as methanol at a concentration of 90% by weight or more) is supplied to an anode.

Next, specific examples according to this embodiment are described.

EXAMPLES

Example 1

Example 1-1

Production of Carbon Catalyst 1

First, raw materials to be carbonized were prepared. That is, 1.5 g of a polyacrylonitrile-polymethacrylic acid copolymer (PAN/PMA-92.5 mol %/7.5 mol %) were dissolved in 30 mL of dimethylformamide, and then 1.5 g of 2-methylimidazole and 1.5 g of cobalt chloride ($CoCl_2$) hexahydrate were added to the solution, followed by stirring at room temperature for 2 hours, to obtain their mixture.

On the other hand, Ketjenblack (ECP600JD, produced by Lion Corporation) and carbon fibers (Carbere, produced by GSI Creos Corporation) were mixed in a weight mixing ratio of 6:4, and the resultant mixture was treated with hydrogen peroxide (the mixture was soaked in a 10% hydrogen peroxide solution at 25° C. for 120 minutes). After that, the mixture was heat-treated again in an atmosphere of nitrogen at 500° C. to remove a functional group on the surface to obtain fibrous water-repellent carbon.

Then, the fibrous water-repellent carbon was added to the above-mentioned mixture so that an amount of the fibrous water-repellent carbon was 30% by weight of a solid content contained in raw materials to be carbonized, and the whole was mixed with a mortar. The resultant mixture was dried in vacuum at 60° C. for 12 hours.

Further, the mixture was heated in the atmosphere and raised in temperature from room temperature to 150° C. over 30 minutes and then from 150° C. to 220° C. over 2 hours. After that, the mixture was kept at 220° C. for 3 hours to infusibilize the mixture. Consequently, raw materials for a carbonized material were prepared.

Next, the raw materials were carbonized. That is, the raw materials infusibilized as described above were placed in a quartz tube. The raw materials were purged with nitrogen in an image furnace for 20 minutes and raised in temperature by heating from room temperature to 900° C. over 18 minutes. After that, the raw materials were kept at 900° C. for 1 hour to be carbonized. Consequently, a carbonized material was obtained.

Further, the carbonized material was pulverized. That is, a silicon nitride ball having a diameter of 10 mm was set in a planetary ball mill (P-7, produced by Fritsch Japan Co., Ltd.), and treatment of pulverizing the carbonized material with the planetary ball mill at a rotation speed of 650 rpm for 5 minutes was performed for 10 cycles. After that, the pulverized carbonized material was taken out, and a carbonized material having passed through a sieve with a mesh size of 106 μm was obtained as a pulverized carbonized material in a fine particle shape.

Next, metal removal treatment by acid washing was performed. That is, 100 mL of concentrated hydrochloric acid was added to 1 g of the above-mentioned carbonized material, and the mixture was stirred for 1 hour. The carbonized material was precipitated, and the solution was removed. After that, 100 mL of a solution in which concentrated hydrochloric acid and distilled water were mixed in 1:1 (volume ratio) was added to the carbonized material, and the mixture was stirred for 1 hour. The carbonized material was precipitated, and the solution was removed. After that, 100 mL of distilled water was added to the carbonized material, and the mixture was stirred for 1 hour. The solution containing the carbonized material was filtered through a filtration membrane (pore diameter: 1.0 μm, produced by Millipore Corporation), and washing with distilled water was performed until a filtrate became neutral. The collected carbonized material was dried in a vacuum at 60° C. for 12 hours. Further, the dried carbonized material was pulverized with a mortar to obtain a pulverized carbon catalyst 1 in a fine particle shape.

Example 1-2

Production of Carbon Catalyst 2

The carbon catalyst 1 obtained in Example 1-1 above was heat-treated. That is, the above-mentioned carbon catalyst 1 was placed in a quartz tube and purged with nitrogen in an image furnace for 20 minutes. The carbon catalyst 1 was raised in temperature by heating from room temperature to 700° C. over 14 minutes. After that, the carbon catalyst 1 was held at 700° C. for 1 hour. Then, the carbon catalyst 1 was pulverized in the same way as in Example 1 above to obtain a pulverized carbon catalyst 2 in a fine particle shape.

Example 1-3

Production of Carbon Catalyst 3

A pulverized carbonized material in a fine particle shape was obtained in the same way as in Example 1 above, except that the steps after the metal removal treatment by acid washing were not performed. Then, the carbonized material was subjected to metal impregnation treatment. That is, a solution prepared by adding 2 g of iron(III) chloride hexahydrate ($FeCl_3 \cdot 6H_2O$) to 300 mL of distilled water was boiled, and 2 g of the carbonized material was added to the iron-containing solution. Then, the carbonized material was impregnated with iron while being stirred in the boiling iron-containing solution for 3 hours. After that, the solution containing the carbonized material was filtered through a filtration membrane (pore diameter: 1.0 μm, produced by Millipore Corporation), and washing with distilled water was performed until a filtrate became neutral. The collected carbonized material was dried in a vacuum at 60° C. for 12 hours. Further, the dried carbonized material was pulverized with a mortar.

Next, the carbonized material was subjected to heat treatment and pulverizing treatment in the same way as in Example 1-2 above. Further, the carbonized material was subjected to metal removal treatment by acid washing in the same way as in Example 1 above. Finally, the carbonized material was subjected to heat treatment and pulverizing treatment in the same way as in Example 1-2 above to obtain a pulverized carbon catalyst 3 in a fine particle shape.

Comparative Example 1

Preparation of a Platinum-Carrying Catalyst

As an oxygen-reducing catalyst carrying platinum, platinum-carrying carbon (UNPC40-II (Pt 38.0 wt %/C), produced by Ishifuku Metal Industry Co., Ltd.) was prepared.
(Electrochemical Measurement)
Next, catalytic activities in an oxygen reduction reaction and a methanol oxidation reaction were evaluated by electrochemical measurement. First, a catalyst slurry was prepared. That is, 5 mg of any one of the above-mentioned carbon catalysts 1 to 3 and platinum-carrying carbon, two spatulas (about 15 beads) of glass beads (diameter: 1 mm), 50 μL of a 5% by weight Nafion (registered trademark) solution (produced by Sigma-Aldrich Co. LLC), 150 μL of ethanol, and 150 μl of distilled water were mixed, and the mixture was subjected to ultrasonic treatment for 10 minutes to prepare a catalyst slurry with a catalyst dispersed uniformly therein.

Next, 4 μL of the catalyst slurry was pipetted and applied to a disc electrode (diameter: 6 mm) of a rotating ring-disc electrode device (RRDE-1 SC-5, produced by Nikko Keisoku), and the catalyst slurry was dried in an atmosphere of saturated water vapor to produce a working electrode. Further, a silver-silver chloride electrode (Ag/AgCl/saturated KCl) was used as a reference electrode, and a platinum wire was used as a counter electrode.

As an electrolytic solution, methanol was mixed with a 0.5 M sulfuric acid aqueous solution to prepare a 0.5 M sulfuric acid aqueous solution containing methanol at a concentration of 0.01 mol/L, 0.05 mol/L, 0.10 mol/L, 0.25 mol/L, or 0.50 mol/L. Further, for comparison, a 0.5M sulfuric acid aqueous solution not containing methanol was also prepared.

Then, cyclic voltammetry and linear sweep voltammetry each using any one of the carbon catalysts 1 to 3 and platinum-carrying carbon for a working electrode of a three-electrode system were performed.

In the cyclic voltammetry, a voltage value was calculated by converting a value measured through use of the silver-silver chloride electrode (Ag/AgCl/saturated KCl) into a normal hydrogen electrode (NHE) reference value. First, an electrolytic solution was saturated with nitrogen by bubbling nitrogen at 25° C. for 20 minutes, and then measurement was started. That is, a cycle of sweeping a potential from 0.8 V (vs. Ag/AgCl) to −0.2 V (vs. Ag/AgCl) at a sweep rate of 50 mV/sec at 25° C. through use of the nitrogen-saturated electrolytic solution without rotating the electrode was performed, and a value of a current flowing through the working electrode was measured. That is, when converted into a normal hydrogen electrode (NHE) reference value, the potential was swept from 1.0 V (vs. NHE) to 0 V (vs. NHE).

In the linear sweep voltammetry, a voltage value was calculated by converting a value measured through use of the silver-silver chloride electrode (Ag/AgCl/saturated KCl) into a normal hydrogen electrode (NHE) reference value. First, an electrolytic solution was saturated with oxygen by bubbling oxygen at 25° C. for 20 minutes, and then a spontaneous potential was measured.

Then, after an initial potential of 0.8 V (vs. Ag/AgCl) was applied for 600 seconds, the potential was swept from 0.8 V (vs. Ag/AgCl) to −0.2 V (vs. Ag/AgCl) at a sweep rate of 1 mV/sec at 25° C. through use of an oxygen-saturated electrolytic solution, by rotating the electrode at a rotation speed of 1,500 rpm, and a value of a current flowing through the working electrode was measured. That is, when converted into a normal hydrogen electrode (NHE) reference value, the potential was swept from 1.0 V (vs. NHE) to 0 V (vs. NHE). Then, a reduction current was measured at a time when the potential was 0.7 V (vs. NHE).

Figure 1B:
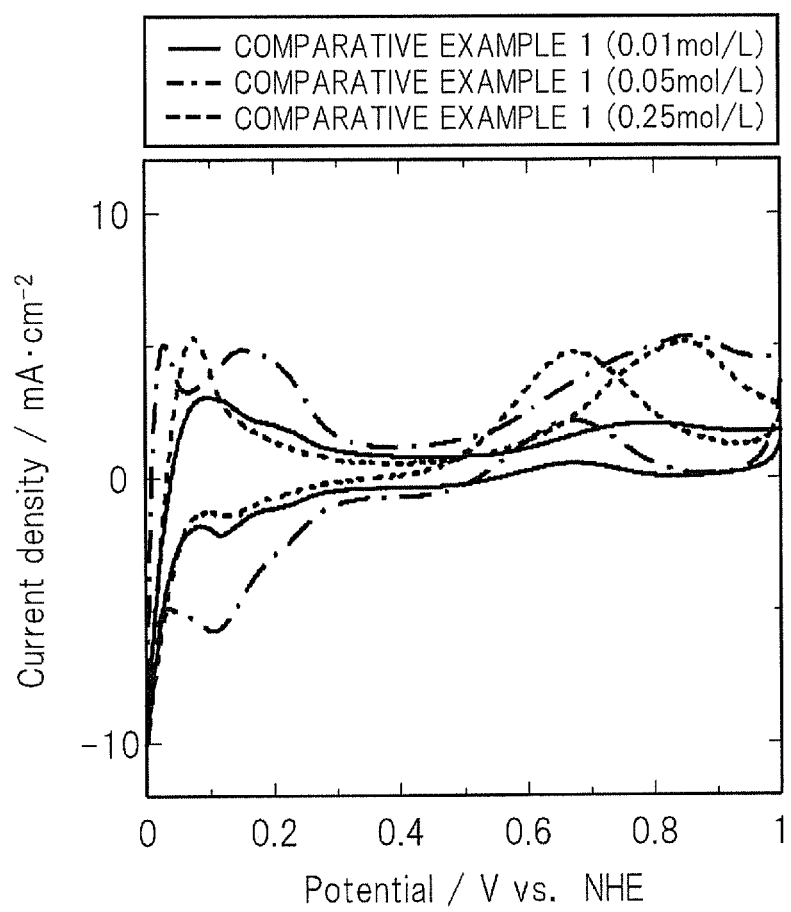
[FIG. 1B] An explanatory diagram showing an example of a voltammogram obtained in cyclic voltammetry using a platinum catalyst and using methanol as a fuel compound.

FIGS. 1A and 1B each show an example of a voltammogram obtained in cyclic voltammetry. In FIGS. 1A and 1B, a horizontal axis indicates an applied potential (V vs. NHE), and a vertical axis indicates a current density (mA/cm$^2$). FIG. 1A shows results in the case of using a nitrogen-saturated electrolytic solution containing methanol at a concentration of 0.25 mol/L and using each of the carbon catalysts 1 to 3 (Examples 1-1 to 1-3) for the working electrode. FIG. 1B shows results in the case of using a nitrogen-saturated electrolytic solution containing methanol at a concentration of 0.01 mol/L, 0.05 mol/L, or 0.25 mol/L and using platinum-carrying carbon (Comparative Example 1) for the working electrode.

As shown in FIG. 1B, in the case of using platinum-carrying carbon for the working electrode (Comparative Example 1), a peak exhibiting a dehydrogenation oxidation reaction of methanol at a low potential (0.35 V or less) and a peak exhibiting an oxidation reaction of carbon oxide (CO) at a high potential (in the vicinity of 0.7 V) appeared clearly. That is, a current in a methanol oxidation reaction was shown. Further, when the concentration of methanol increased, a CO oxidation peak increased, and hence, it was considered that platinum-carrying carbon did not function as a cathode catalyst in an electrolytic solution in which methanol was present at a certain concentration or higher.

In contrast, as shown in FIG. 1A, in the case of using the carbon catalyst 1, the carbon catalyst 2, or the carbon catalyst 3 for the working electrode (Examples 1-1 to 1-3), a methanol oxidation reaction that influences the oxygen reduction reaction was not shown at a potential in a range of 0.6 V (vs. NHE) to 1.0 V (vs. NHE).

Further, in the case of using these carbon catalysts, the shape of a current-potential curve in an oxidation reduction cycle of cyclic voltammetry was symmetrical. That is, it was shown that these carbon catalysts did not catalyze the methanol oxidation reaction in an electrolytic solution containing methanol. Although FIG. 1A shows the result in the case where the methanol concentration was 0.25 mol/L, similar results were obtained for other methanol concentrations (including the case where the methanol concentration was zero).

Figure 2A:
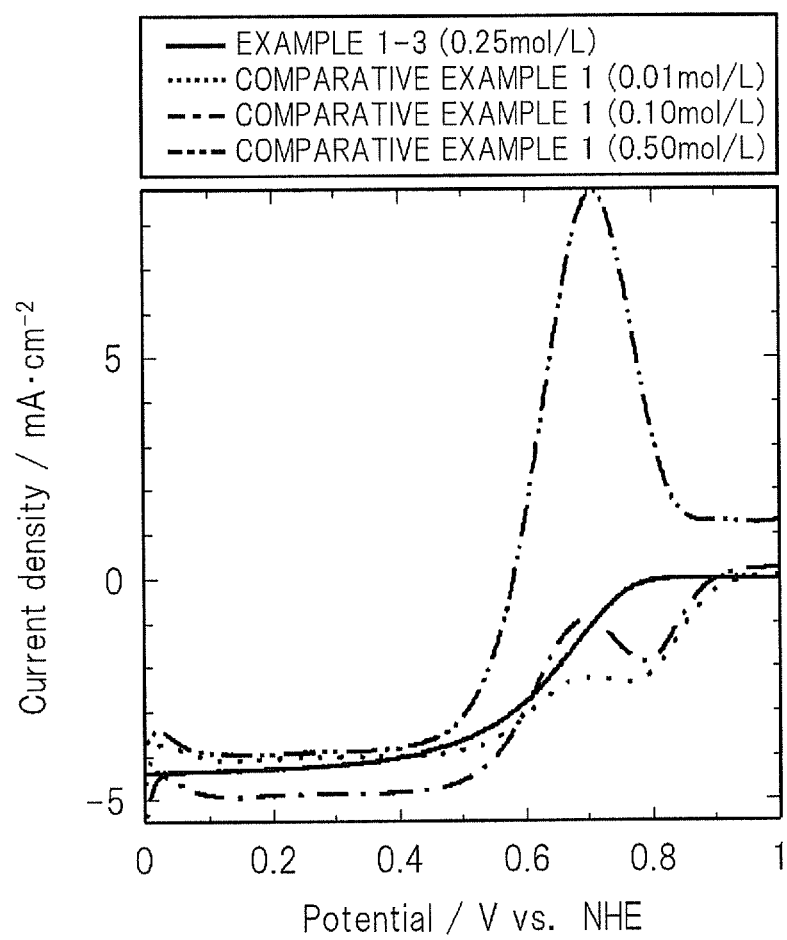
[FIG. 2A] An explanatory diagram showing an example of a voltammogram obtained in linear sweep voltammetry using a carbon catalyst according to an embodiment of the present invention and a platinum catalyst, and using methanol as a fuel compound.
Figures 2B, 3:
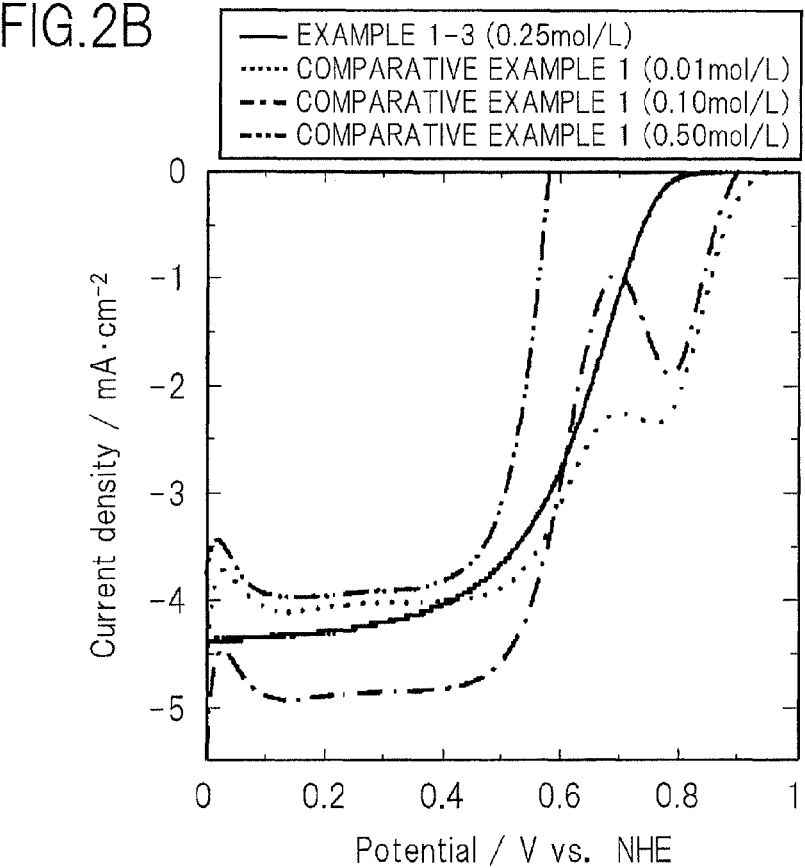
[FIG. 2B] An explanatory diagram showing a part of FIG. 2A in an enlarged state.
[FIG. 3] An explanatory diagram showing an example of results obtained by measuring a reduction current in linear sweep voltammetry using a carbon catalyst according to an embodiment of the present invention and a platinum catalyst, and using methanol as a fuel compound.

FIGS. 2A and 2B each show an example of a voltammogram obtained in linear sweep voltammetry. In FIGS. 2A and 2B, a horizontal axis indicates an applied potential (V vs. NHE), and a vertical axis indicates a current density (mA/cm$^2$). FIG. 2A shows results in the case of using an electrolytic solution containing methanol at a concentration of 0.25 mol/L and using the carbon catalyst 3 (Example 1-3) for the working electrode, and the case of using an electrolytic solution containing methanol at a concentration of 0.01 mol/L, 0.10 mol/L, or 0.50 mol/L and using platinum-carrying carbon (Comparative Example 1) for the working electrode. FIG. 2B shows a portion of the results shown in FIG. 2A at a current density of zero (mA/cm$^2$) or less in an enlarged state.

Further, FIG. 3 shows reduction currents measured at a potential of 0.7 V (vs. NHE) in linear sweep voltammetry. The reduction currents shown in FIG. 3 are values read as current densities corresponding to the potential of 0.7V (vs. NHE) in the voltammograms as shown in FIGS. 2A and 2B. Regarding platinum-carrying carbon (Comparative Example 1), measurement using an electrolytic solution not containing methanol was not conducted.

As shown in FIGS. 2A, 2B, and 3, in the case of using platinum-carrying carbon for the working electrode (Comparative Example 1), a reduction current when a voltage of 0.7 V (vs. NHE) was applied changed largely depending on a change in methanol concentration in the electrolytic solution. That is, it was shown that platinum-carrying carbon exhibited not only an oxygen-reducing catalytic activity but also a methanol oxidation catalytic activity, and as the methanol concentration increased, platinum-carrying carbon exhibited the methanol oxidation catalytic activity more dominantly. Thus, it was considered that in the case where the methanol concentration in the electrolytic solution was a predetermined value or more, platinum-carrying carbon did not function as a cathode catalyst.

In contrast, in the case of using the carbon catalyst 1, the carbon catalyst 2, or the carbon catalyst 3 for the working electrode (Examples 1-1 to 1-3), a reduction current when a voltage of 0.7 V (vs. NHE) was applied was almost constant irrespective of the methanol concentration in the electrolytic solution. Specifically, the carbon catalyst 1, the carbon catalyst 2, and the carbon catalyst 3 selectively exhibited only an oxygen-reducing catalytic activity without exhibiting a methanol oxidation catalytic activity.

Specifically, in all the cases, including the case where an electrolytic solution did not contain methanol and the case where an electrolytic solution at least contained methanol at a concentration up to 0.50 mol/L, a reduction current in the case of using the carbon catalyst 1 (Example 1-1) was constant at $-0.73$ mA/cm$^2$, a reduction current in the case of using the carbon catalyst 2 (Example 1-2) was constant at a lower value of $-0.92$ mA/cm$^2$, and a reduction current in the case of using the carbon catalyst 3 (Example 1-3) was constant at a still lower value of $-1.12$ mA/cm$^2$.

That is, by using the carbon catalysts 1 to 3, a reduction current of $-0.6$ mA/cm$^2$ or less or $-0.7$ mA/cm$^2$ or less was achieved. Further, by using the carbon catalysts 2 and 3, a reduction current of $-0.8$ mA/cm$^2$ or less or $-0.9$ mA/cm$^2$ or less was achieved. Further, by using the carbon catalyst 3, a reduction current of $-1.0$ mA/cm$^2$ or less or $-1.1$ mA/cm$^2$ or less was achieved.

Further, when the methanol concentration in the electrolytic solution reached 0.1 mol/L, a reduction current higher than that in the case of using platinum-carrying carbon (Comparative Example 1) was obtained by using the carbon catalyst 3 (Example 1-3). Further, in the case where the methanol concentration in the electrolytic solution was more than 0.10 mol/L (the case where the methanol concentration was at least 0.25 mol/L), a reduction current higher than that in the case of using platinum-carrying carbon (Comparative Example 1) was obtained by using any one of the carbon catalysts 1 to 3 (Examples 1-1 to 1-3).

It was shown from the above-mentioned results that, by using each of those carbon catalysts as an oxygen-reducing catalyst for a cathode of a direct methanol fuel cell, only an oxygen reduction reaction was promoted selectively and effectively without promoting a methanol oxidation reaction in the cathode, even when methanol crossover occurred. Further, it was considered that by using each of these carbon catalysts for the cathode, a direct methanol fuel cell capable of using methanol at a high concentration was to be attained.

Example 2

Catalytic activities in an oxygen reduction reaction and an ethanol oxidation reaction were evaluated by electrochemical measurement. That is, cyclic voltammetry and linear sweep voltammetry each using any one of the carbon catalyst 3 and platinum-carrying carbon for a working electrode of a three-electrode system were performed under the same conditions as those of Example 1 above, except that a 0.5M sulfuric acid aqueous solution containing ethanol at a concentration of 0.10 mol/L, 0.25 mol/L, 0.50 mol/L, or 4.2 mol/L was used.

Figure 4A:
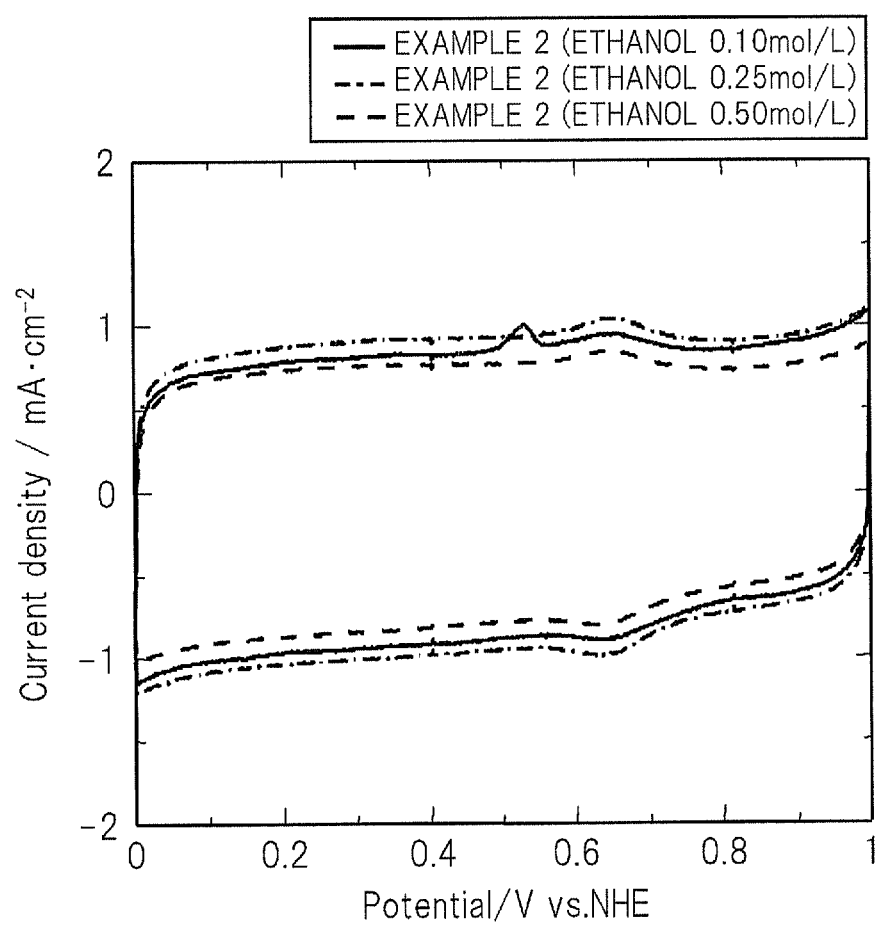
[FIG. 4A] An explanatory diagram showing an example of a voltammogram obtained in cyclic voltammetry using a carbon catalyst according to an embodiment of the present invention and using ethanol as a fuel compound.
Figure 4B:
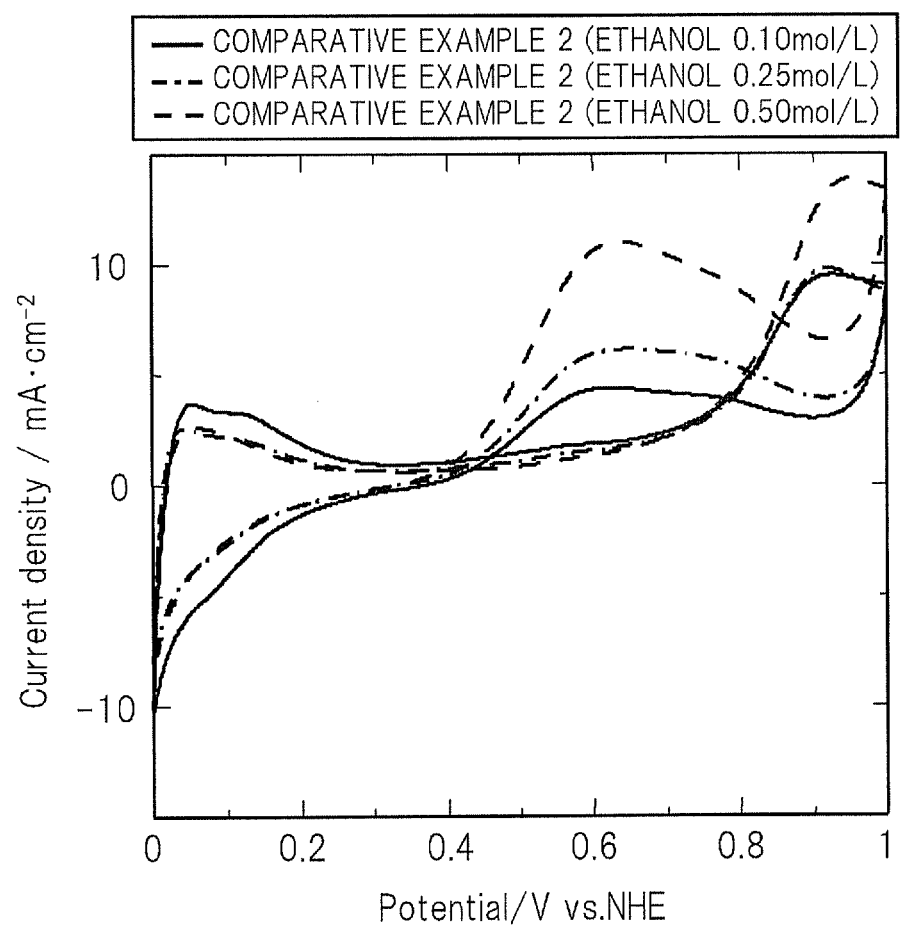
[FIG. 4B] An explanatory diagram showing an example of a voltammogram obtained in cyclic voltammetry using a platinum catalyst and using ethanol as a fuel compound.
Figure 4C:
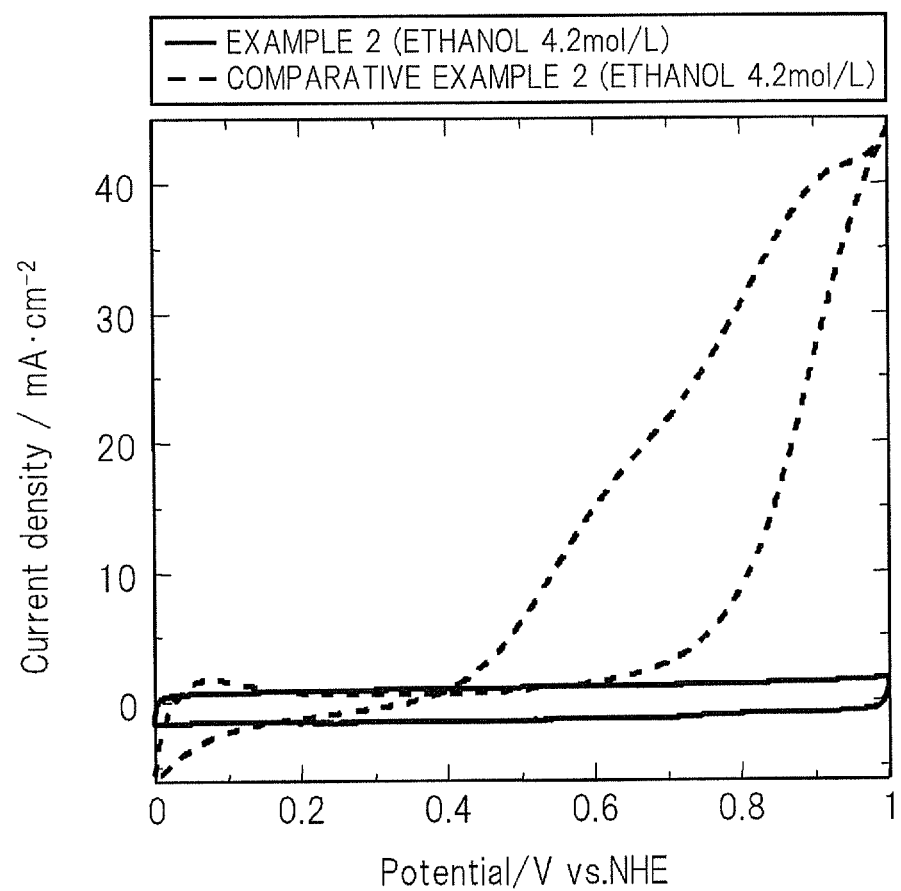
[FIG. 4C] An explanatory diagram showing another example of a voltammogram obtained in cyclic voltammetry using a carbon catalyst according to an embodiment of the present invention and a platinum catalyst, and using ethanol as a fuel compound.

FIGS. 4A, 4B, and 4C each show an example of a voltammogram obtained in cyclic voltammetry. In FIGS. 4A, 4B, and 4C, a horizontal axis indicates an applied potential (V vs. NHE), and a vertical axis indicates a current density (mA/cm$^2$). FIGS. 4A and 4B show results in the case of using an electrolytic solution containing ethanol at a concentration of 0.10 mol/L, 0.25 mol/L, or 0.50 mol/L, and using the carbon catalyst 3 (Example 2) and platinum-carrying carbon (Comparative Example 2) respectively for the working electrode. FIG. 4O shows results in the case of using an electrolytic solution containing ethanol at a concentration of 4.2 mol/L and using the carbon catalyst 3 (Example 2) or platinum-carrying carbon (Comparative Example 2) for the working electrode.

As shown in FIGS. 4B and 4C, in the case of using platinum-carrying carbon for the working electrode (Comparative Example 2), a current in an ethanol oxidation reaction was exhibited. The results suggested that platinum-carrying carbon did not function as a cathode catalyst in an electrolytic solution in which ethanol was present at a certain concentration or higher.

In contrast, as shown in FIGS. 4A and 4C, in the case of using the carbon catalyst 3 for the working electrode (Example 2), an ethanol oxidation reaction that influences the oxygen reduction reaction was not shown at a potential in a range of 0.6 V (vs. NHE) to 1.0 V (vs. NHE).

Particularly from FIG. 4C, it was shown that even when the ethanol concentration was relatively high (i.e., 4.2 mol/L), the carbon catalyst 3 functioned sufficiently as a cathode catalyst. On the other hand, it was shown that platinum-carrying carbon did not function as a cathode catalyst at such high ethanol concentration.

Further, in the case of using the carbon catalyst 3, the shape of a current-potential curve in an oxidation reduction cycle of cyclic voltammetry using an electrolytic solution containing ethanol was symmetrical. That is, it was shown that the carbon catalyst 3 did not catalyze an ethanol oxidation reaction in an electrolytic solution containing ethanol.

Figure 5B:
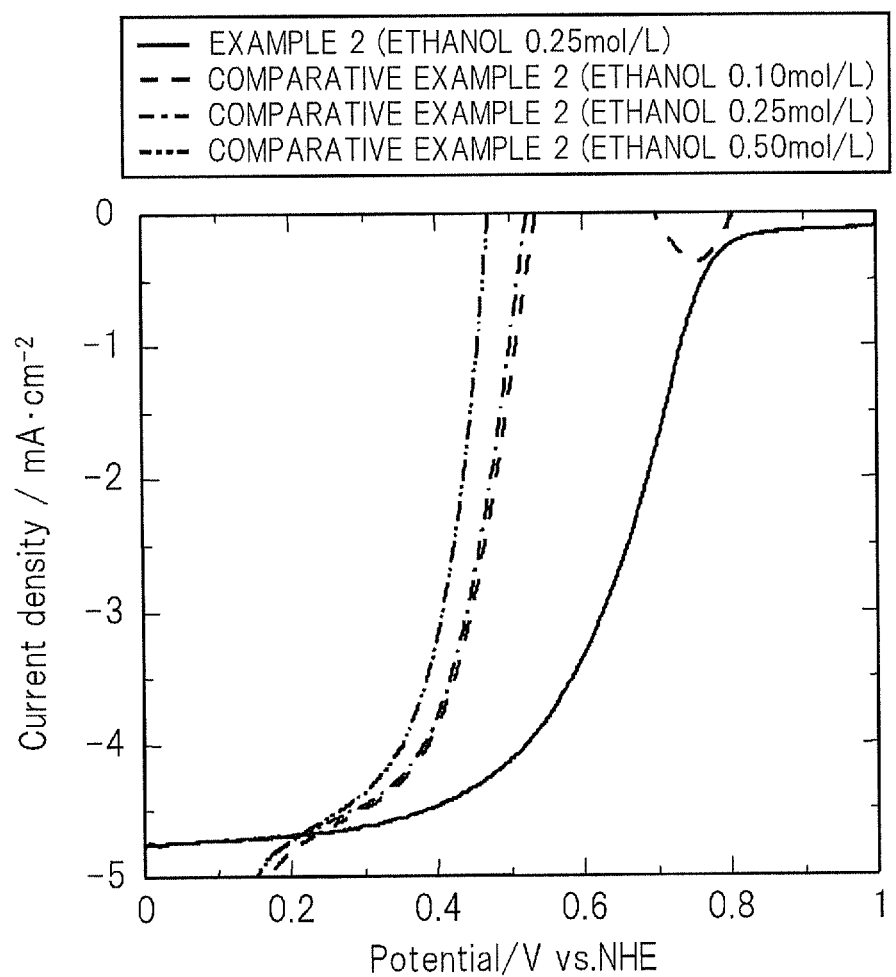
[FIG. 5B] An explanatory diagram showing a part of FIG. 5A in an enlarged state.
Figures 5C, 6:
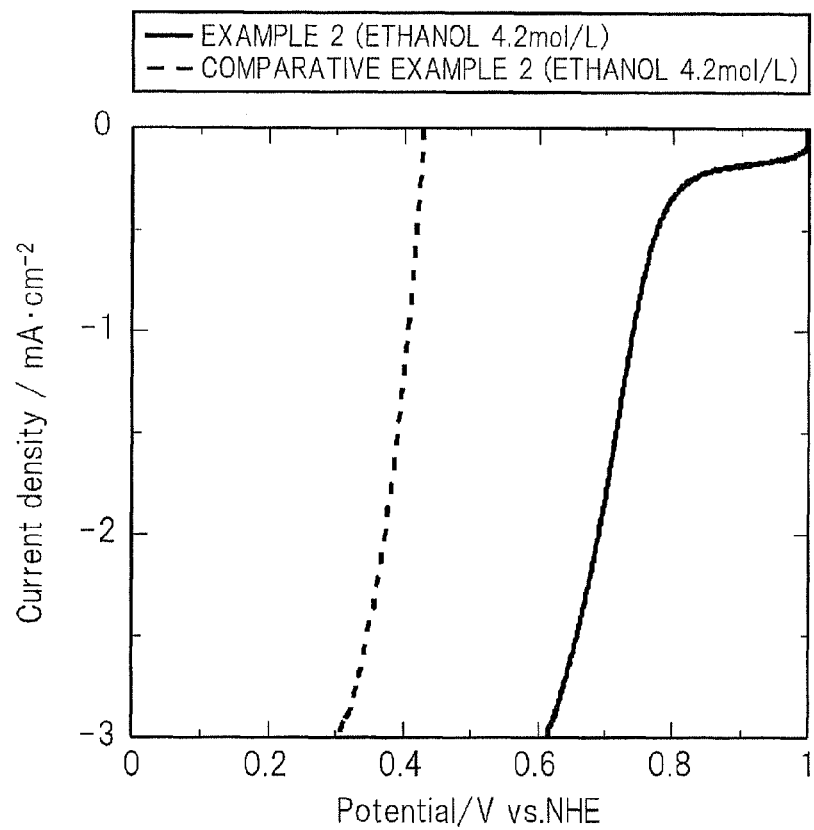
[FIG. 5C] An explanatory diagram showing another example of a voltammogram obtained in linear sweep voltammetry using a carbon catalyst according to an embodiment of the present invention and a platinum catalyst, and using ethanol as a fuel compound.
[FIG. 6] An explanatory diagram showing an example of results obtained by measuring a reduction current in linear sweep voltammetry using a carbon catalyst according to an embodiment of the present invention and a platinum catalyst, and using ethanol as a fuel compound.

FIGS. 5A, 5B, and 5C each show an example of a voltammogram obtained in linear sweep voltammetry. In FIGS. 5A, 5B, and 5C, a horizontal axis indicates an applied potential (V vs. NHE), and a vertical axis indicates a current density (mA/cm$^2$).

FIG. 5A shows results in the case of using an electrolytic solution containing ethanol at a concentration of 0.25 mol/L and using the carbon catalyst 3 for the working electrode (Example 2), and the case of using an electrolytic solution containing ethanol at a concentration of 0.10 mol/L, 0.25 mol/L, or 0.50 mol/L and using platinum-carrying carbon for the working electrode (Comparative Example 2). FIG. 5B shows a portion of the results shown in FIG. 5A at a current density of zero (mA/cm$^2$) or less in an enlarged state.

Further, FIG. 5C shows a portion of the results in the case of using an electrolytic solution containing ethanol at a concentration of 4.2 mol/L and using the carbon catalyst 3 (Example 2) or platinum-carrying carbon (Comparative Example 2) for the working electrode at a current density of zero (mA/cm$^2$) or less in an enlarged state.

Further, FIG. 6 shows reduction currents measured at a potential of 0.7 V (vs. NHE) in linear sweep voltammetry. The reduction currents shown in FIG. 6 are values read as current densities corresponding to the potential of 0.7 V (vs. NHE) in the voltammograms as shown in FIGS. 5A, 5B, and 5C.

As shown in FIGS. 5A, 5B, 5C, and 6, in the case of using platinum-carrying carbon for the working electrode (Comparative Example 2), a reduction current when a voltage of 0.7 V (vs. NHE) was applied changed largely depending on a change in ethanol concentration in the electrolytic solution. That is, it was shown that platinum-carrying carbon exhibited not only an oxygen-reducing catalytic activity but also an ethanol oxidation catalytic activity, and as the ethanol concentration increased, platinum-carrying carbon exhibited the ethanol oxidation catalytic activity more dominantly. Thus, it was considered that in the case where the ethanol concentration in the electrolytic solution was a predetermined value or more, platinum-carrying carbon did not function as a cathode catalyst.

In contrast, in the case of using the carbon catalyst 3 for the working electrode (Example 2), a reduction current when a voltage of 0.7 V (vs. NHE) was applied was almost constant irrespective of the ethanol concentration in the electrolytic solution. That is, the carbon catalyst 3 selectively exhibited only an oxygen-reducing catalytic activity without exhibiting an ethanol oxidation catalytic activity.

Specifically, in the case where the electrolytic solution did not contain ethanol (the case where the methanol concentration of FIG. 3 shown in Example 1 above was 0 mol/L), a reduction current in the case of using the carbon catalyst 3 (Example 1-3 shown in FIG. 3) was $-1.12$ mA/cm$^2$, and in the case where the electrolytic solution at least contained ethanol at a concentration up to 4.2 mol/L (FIG. 6), a reduction current in the case of using the carbon catalyst 3 (Example 2 shown in FIG. 6) was lower (i.e., $-1.73$ mA/cm$^2$).

Further, in the case where the ethanol concentration in the electrolytic solution was at least 0.10 mol/L, a reduction current lower than that in the case of using platinum-carrying carbon (Comparative Example 2) was obtained by using the carbon catalyst 3 (Example 2).

It was shown from the above-mentioned results that by using the catalyst of the present invention as an oxygen-reducing catalyst for a cathode of a direct alcohol fuel cell using ethanol as a fuel compound, only an oxygen reduction reaction was promoted selectively and effectively without promoting an ethanol oxidation reaction in the cathode even when crossover occurred. Further, it was considered that by using the catalyst of the present invention for the cathode, a direct ethanol fuel cell using ethanol at a high concentration as a fuel compound was to be attained.

Example 3

Catalytic activities in an oxygen reduction reaction and an alcohol oxidation reaction were evaluated by using three kinds of alcohols as fuel compounds. That is, cyclic voltammetry and linear sweep voltammetry using any one of the carbon catalyst 3 and platinum-carrying carbon for a working electrode of a three-electrode system were performed under the same conditions as those of Example 1 above using, as electrolytic solutions, a 0.5 M sulfuric acid aqueous solution containing ethanol at a relatively high concentration (4.2 mol/L), a 0.5 M sulfuric acid aqueous solution containing ethylene glycol as a dihydric primary alcohol at a concentration of 0.25 mol/L, and a 0.5 M sulfuric acid aqueous solution containing isopropyl alcohol as a monohydric secondary alcohol at a concentration of 0.25 mol/L, respectively.

Figure 7A:
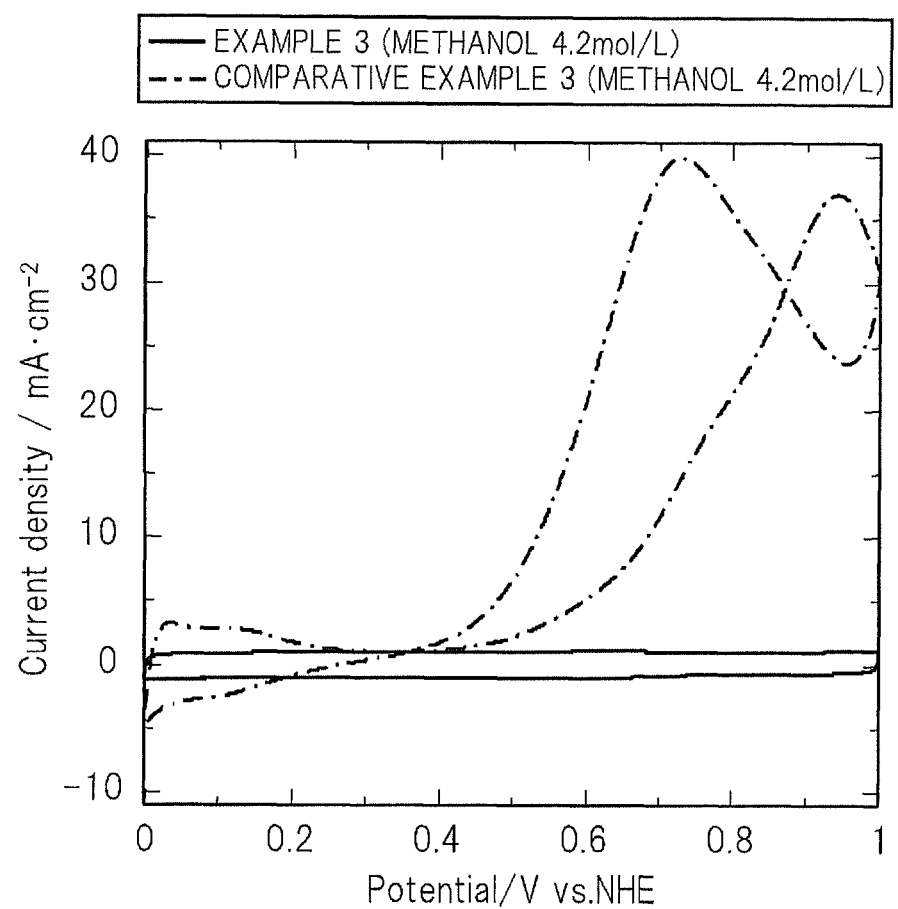
[FIG. 7A] An explanatory diagram showing another example of a voltammogram obtained in cyclic voltammetry using a carbon catalyst according to an embodiment of the present invention, and using methanol as a fuel compound.
Figure 7B:
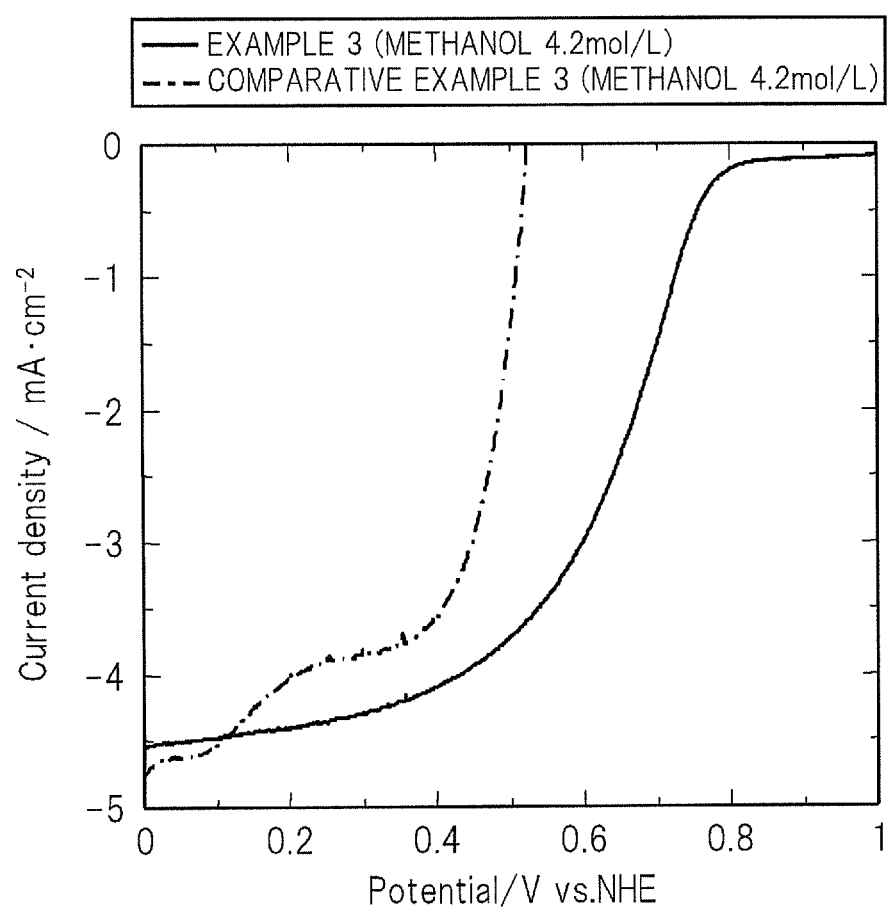
[FIG. 7B] An explanatory diagram showing another example of a voltammogram obtained in linear sweep voltammetry using a carbon catalyst according to an embodiment of the present invention and a platinum catalyst, and using methanol as a fuel compound.
Figure 8A:
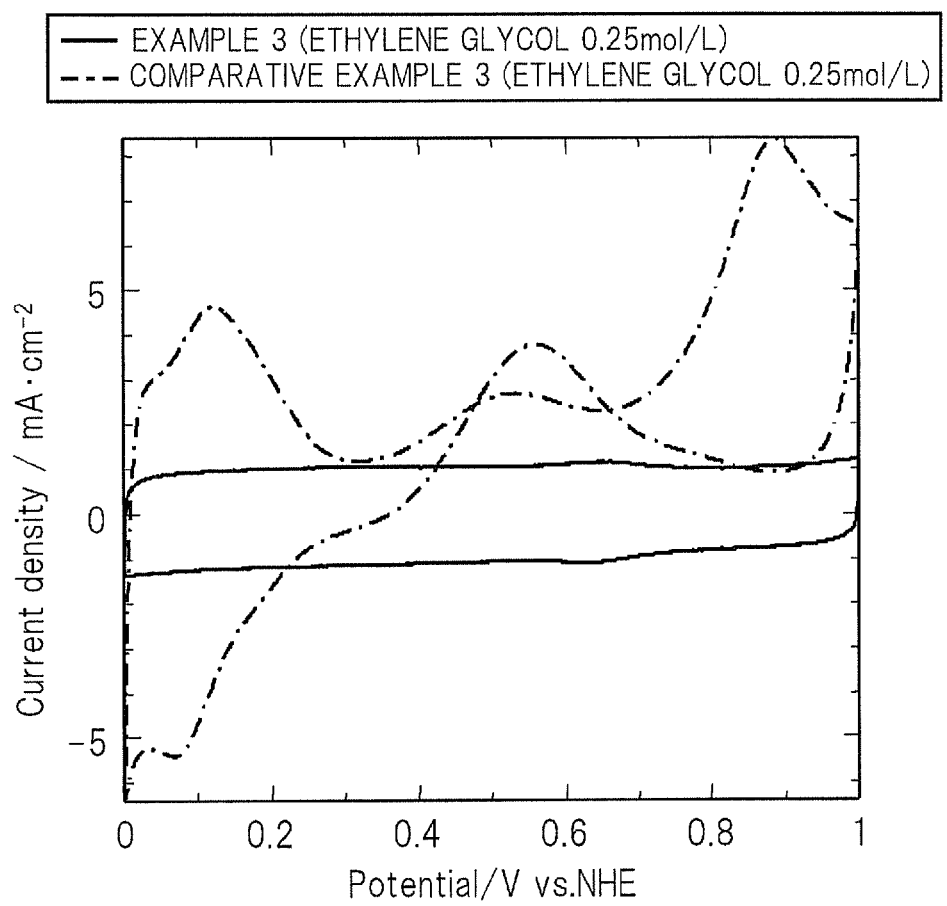
[FIG. 8A] An explanatory diagram showing an example of a voltammogram obtained in cyclic voltammetry using a carbon catalyst according to an embodiment of the present invention and a platinum catalyst, and using ethylene glycol as a fuel compound.
Figure 8B:
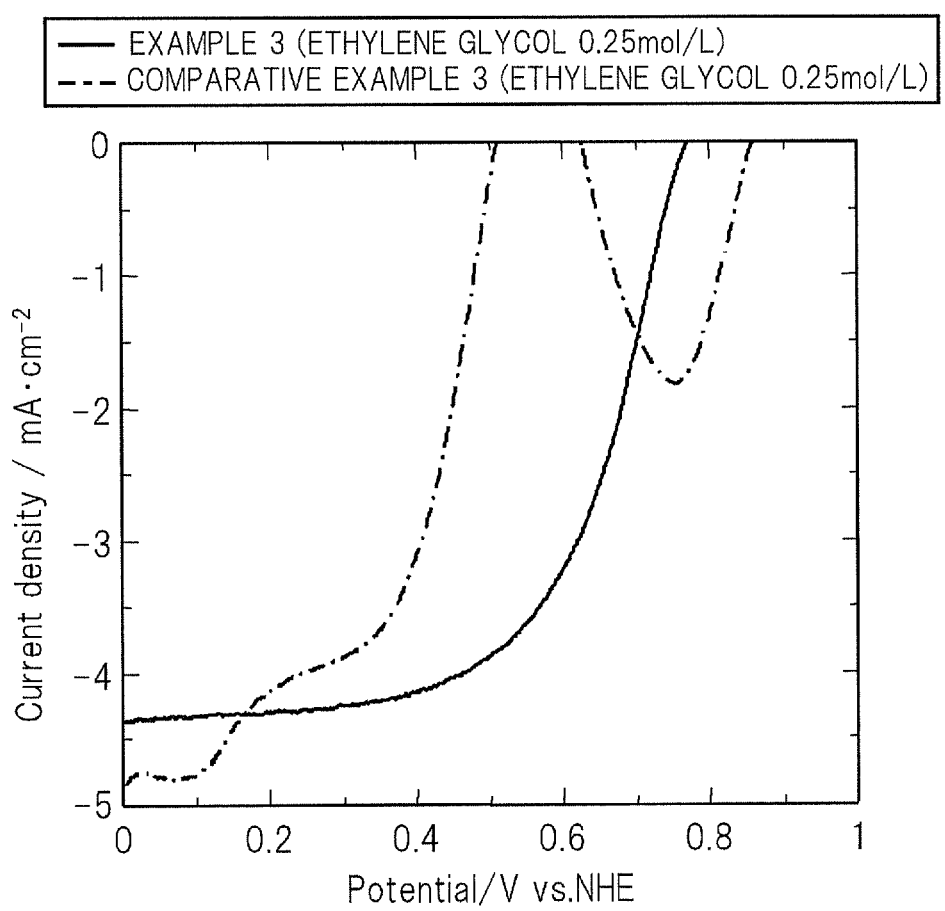
[FIG. 8B] An explanatory diagram showing an example of a voltammogram obtained in linear sweep voltammetry using a carbon catalyst according to an embodiment of the present invention and a platinum catalyst, and using ethylene glycol as a fuel compound.
Figure 9A:
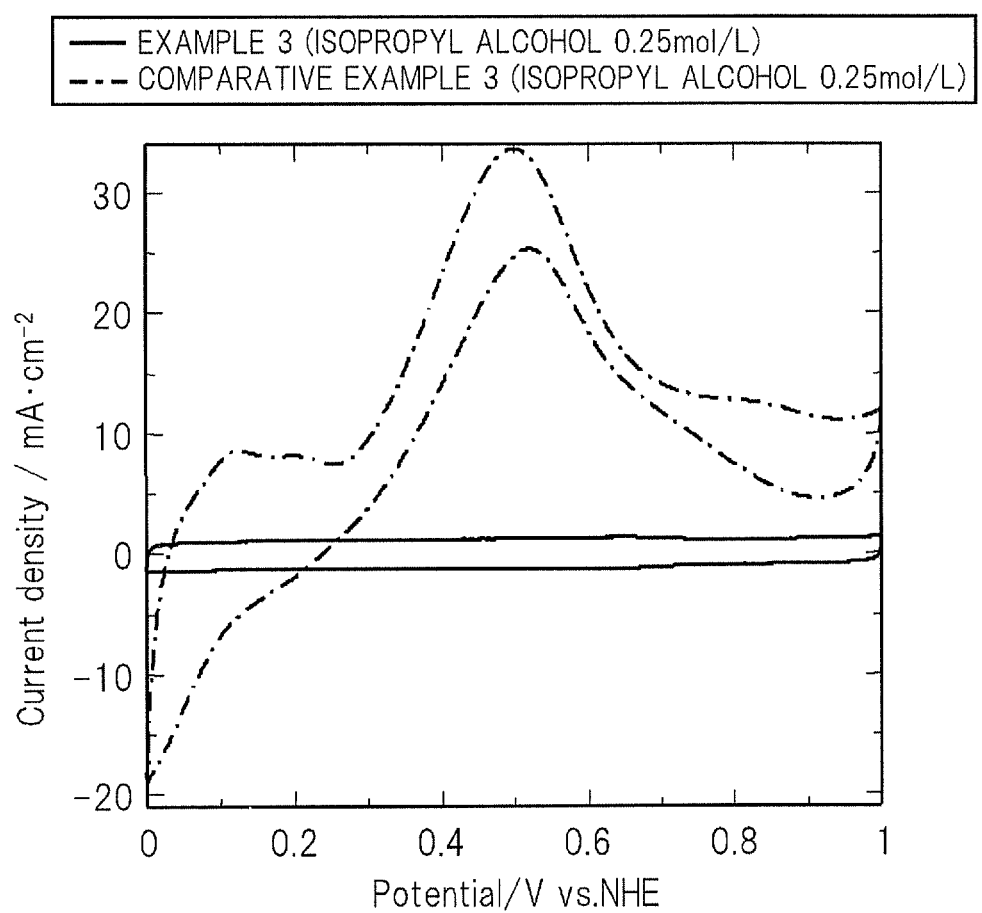
[FIG. 9A] An explanatory diagram showing an example of a voltammogram obtained in cyclic voltammetry using a carbon catalyst according to an embodiment of the present invention and a platinum catalyst, and isopropyl alcohol as a fuel compound.
Figures 9B, 10:
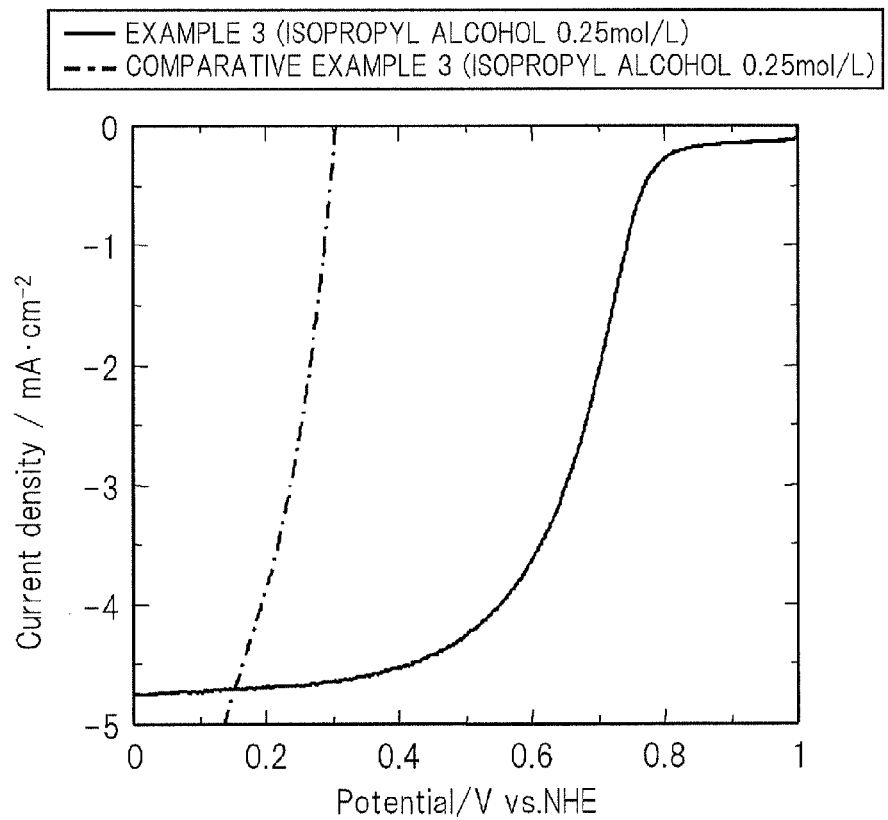
[FIG. 9B] An explanatory diagram showing an example of a voltammogram obtained in linear sweep voltammetry using a carbon catalyst according to an embodiment of the present invention and a platinum catalyst, and isopropyl alcohol as a fuel compound.
[FIG. 10] An explanatory diagram showing an example of results obtained by measuring a reduction current in linear sweep voltammetry using a carbon catalyst according to an embodiment of the present invention and a platinum catalyst, and using methanol, ethylene glycol, and isopropyl alcohol as fuel compounds.

FIGS. 7A, 8A, and 9A show examples of results of cyclic voltammetry using methanol, ethylene glycol, and isopropyl alcohol, respectively. Further, FIGS. 7B, 8B, and 9B show examples of results of linear sweep voltammetry using methanol, ethylene glycol, and isopropyl alcohol, respectively. In FIGS. 7 to 9, a horizontal axis indicates an applied potential (V vs. NHE), and a vertical axis indicates a current density (mA/cm$^2$).

First, as shown in FIGS. 7A and 7B, in the case of using the carbon catalyst 3 (Example 3), it was shown that no methanol oxidation reaction occurred, and an oxygen reduction reaction was not influenced by methanol present at a relatively high concentration (4.2 mol/L). That is, it was shown that the carbon catalyst 3 functioned sufficiently as a cathode catalyst even in an electrolytic solution containing methanol at a relatively high concentration.

On the other hand, in the case of using platinum-carrying carbon (Comparative Example 3), a methanol oxidation reaction occurred. That is, it was shown that platinum-carrying carbon did not function as a cathode catalyst.

Next, as shown in FIGS. 8A and 8B, in the case of using the carbon catalyst 3 (Example 3), it was shown that no ethylene glycol oxidation reaction occurred, and an oxygen reduction reaction was not influenced by ethylene glycol present at a concentration of 0.25 mol/L. That is, it was shown that the carbon catalyst 3 functioned sufficiently as a cathode catalyst even in an electrolytic solution containing ethylene glycol.

On the other hand, in the case of using platinum-carrying carbon (Comparative Example 3), an ethylene glycol oxidation reaction occurred. That is, it was shown that platinum-carrying carbon did not function as a cathode catalyst.

In addition, as shown in FIGS. 9A and 9B, in the case of using the carbon catalyst 3 (Example 3), it was shown that no isopropyl alcohol oxidation reaction occurred, and an oxygen reduction reaction was not influenced by isopropyl alcohol present at a concentration of 0.25 mol/L. That is, it was shown that the carbon catalyst 3 functioned sufficiently as a cathode catalyst even in an electrolytic solution containing isopropyl alcohol.

On the other hand, in the case of using platinum-carrying carbon (Comparative Example 3), an isopropyl alcohol oxidation reaction occurred. That is, it was shown that platinum-carrying carbon did not function as a cathode catalyst.

Further, FIG. 10 shows reduction currents measured at a potential of 0.7 V (vs. NHE) in linear sweep voltammetry. The reduction currents shown in FIG. 10 are values read as current densities corresponding to the potential of 0.7 V (vs. NHE) in the voltammograms as shown in FIGS. 7B, 8B, and 9B.

As is apparent from FIG. 10, it was shown that, not only in the case of using methanol or ethanol as a fuel compound but also in the case of using another alcohol such as ethylene glycol or isopropyl alcohol as a fuel compound, the carbon catalyst 3 promoted only an oxygen reduction reaction selectively and effectively without promoting an oxidation reaction of the alcohol on a cathode side, without being influenced by a so-called crossover phenomenon. In addition, it was shown that in the same way as shown in the case of using ethanol in FIG. 6, even in the case of using methanol at a high concentration, the carbon catalyst 3 promoted only an oxygen reduction reaction selectively and effectively without promoting a methanol oxidation reaction on a cathode side, without being influenced by a crossover phenomenon.

Accordingly, by using the catalyst of the present invention for a cathode, a direct alcohol fuel cell using a fuel compound other than methanol, such as ethanol, ethylene glycol, or isopropyl alcohol, is realized. Further, by using the catalyst of the present invention for a cathode, a direct methanol fuel cell using methanol at a high concentration as a fuel compound is realized.

The invention claimed is:

1. A carbon catalyst for a cathode of a direct fuel cell, the carbon catalyst exhibiting an oxygen-reducing catalytic activity in an electrolytic solution containing a fuel compound for the direct fuel cell and exhibiting substantially no catalytic activity to oxidize the fuel compound in the electrolytic solution,
wherein the carbon catalyst is obtained by the following steps in order:
(i) carbonizing raw materials comprising a nitrogen-containing organic substance and a metal to obtain a carbonized material,
(ii) followed by subjecting the carbonized material to metal removal treatment, and then
(iii) further subjecting the carbonized material to heat treatment at a temperature of 300° C. or more and 1500° C. or less.

2. The carbon catalyst for a cathode of a direct fuel cell according to claim 1, wherein a reduction current is −0.6 mA/cm$^2$ or less at a potential of 0.7 V (vs. NHE) in sweeping at a sweep rate of 1 mV/sec at 25° C. using an oxygen-saturated electrolytic solution containing the fuel compound at a concentration of 0.25 mol/L, in linear sweep voltammetry using the carbon catalyst for a working electrode of a three-electrode system.

3. The carbon catalyst for a cathode of a direct fuel cell according to claim 1, wherein the carbon catalyst exhibits no catalytic activity to oxidize the fuel compound influencing the oxygen-reducing catalytic activity of the carbon catalyst at a potential ranging from 0.6 V (vs. NHE) to 1.0 V (vs. NHE) in a case of using a nitrogen-saturated electrolytic solution containing the fuel compound, in cyclic voltammetry performed at 25° C. using the carbon catalyst for a working electrode of a three-electrode system.

4. The carbon catalyst for a cathode of a direct fuel cell according to claim 1, wherein a reduction current at a potential of 0.7 V (vs. NHE) in sweeping at a sweep rate of 1 mV/sec at 25° C. using an oxygen-saturated electrolytic solution containing the fuel compound, in linear sweep voltammetry using the carbon catalyst for a working electrode of a three-electrode system, is substantially independent of a concentration of the fuel compound contained in the electrolytic solution.

5. The carbon catalyst for a cathode of a direct fuel cell according to claim 1, wherein the fuel compound comprises an alcohol.

6. The carbon catalyst for a cathode of a direct fuel cell according to claim 1, wherein the raw materials further comprise a conductive carbon material.

7. A cathode for a direct fuel cell, comprising the carbon catalyst according to claim 1.

8. A direct fuel cell, comprising a cathode comprising the carbon catalyst according to claim 1.

9. A method of reducing oxygen, comprising:
catalyzing oxygen reduction in an electrolytic solution containing a fuel compound for a direct fuel cell by having the carbon catalyst according to claim 1 present in the electrolytic solution.

10. A carbon catalyst for a cathode of a direct fuel cell, the carbon catalyst exhibiting an oxygen-reducing catalytic activity in an electrolytic solution containing a fuel compound for the direct fuel cell and exhibiting substantially no catalytic activity to oxidize the fuel compound in the electrolytic solution,
wherein the carbon catalyst is obtained by
carbonizing raw materials comprising a nitrogen-containing organic substance and a metal to obtain a carbonized material;
followed by subjecting the carbonized material to metal impregnation treatment, and
further subjecting the carbonized material to heat treatment.

11. The carbon catalyst for a cathode of a direct fuel cell according to claim 10, wherein a reduction current is −0.6 mA/cm$^2$ or less at a potential of 0.7 V (vs. NHE) in sweeping at a sweep rate of 1 mV/sec at 25° C. using an oxygen-saturated electrolytic solution containing the fuel compound at a concentration of 0.25 mol/L, in linear sweep voltammetry using the carbon catalyst for a working electrode of a three-electrode system.

12. The carbon catalyst for a cathode of a direct fuel cell according to claim 10, wherein the carbon catalyst exhibits no catalytic activity to oxidize the fuel compound influencing the oxygen-reducing catalytic activity of the carbon catalyst at a potential ranging from 0.6 V (vs. NHE) to 1.0 V (vs. NHE) in a case of using a nitrogen-saturated electrolytic solution containing the fuel compound, in cyclic voltammetry performed at 25° C. using the carbon catalyst for a working electrode of a three-electrode system.

13. The carbon catalyst for a cathode of a direct fuel cell according to claim 10, wherein a reduction current at a potential of 0.7 V (vs. NHE) in sweeping at a sweep rate of 1 mV/sec at 25° C. using an oxygen-saturated electrolytic solution containing the fuel compound, in linear sweep voltammetry using the carbon catalyst for a working electrode of a three-electrode system, is substantially independent of a concentration of the fuel compound contained in the electrolytic solution.

14. The carbon catalyst for a cathode of a direct fuel cell according to claim 10, wherein the fuel compound comprises an alcohol.

15. The carbon catalyst for a cathode of a direct fuel cell according to claim 10, wherein the raw materials further comprise a conductive carbon material.

16. A cathode for a direct fuel cell, comprising the carbon catalyst according to claim 10.

17. A direct fuel cell, comprising a cathode comprising the carbon catalyst according to claim 10.

18. A method of reducing oxygen, comprising:
catalyzing oxygen reduction in an electrolytic solution containing a fuel compound for a direct fuel cell by having the carbon catalyst according to claim 10 present in the electrolytic solution.

* * * * *